(12) United States Patent
Miyake

(10) Patent No.: US 7,017,169 B2
(45) Date of Patent: Mar. 21, 2006

(54) DISK CARTRIDGE AND DISK RECORDING AND REPRODUCING APPARATUS

(75) Inventor: Tomoyuki Miyake, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 640 days.

(21) Appl. No.: 10/051,829

(22) Filed: Jan. 17, 2002

(65) Prior Publication Data

US 2002/0093900 A1    Jul. 18, 2002

(30) Foreign Application Priority Data

Jan. 17, 2001   (JP) .............................. 2001-009534

(51) Int. Cl.
*G11B 33/02*        (2006.01)

(52) U.S. Cl. .................................. 720/729
(58) Field of Classification Search ................ 369/291; 720/728, 729, 730, 726, 727; 360/132, 133
See application file for complete search history.

(56) References Cited

U.S. PATENT DOCUMENTS

| 5,572,498 | A | * | 11/1996 | Choi ........................... 720/627 |
| 5,812,511 | A | * | 9/1998 | Kawamura et al. ......... 720/616 |
| 5,923,630 | A | * | 7/1999 | Yoshida et al. ............. 720/720 |
| 5,995,345 | A | * | 11/1999 | Overbo ....................... 360/133 |
| 6,108,299 | A | * | 8/2000 | Kano et al. ................. 720/734 |
| 6,122,142 | A | * | 9/2000 | Kabasawa ................ 360/99.06 |
| 6,262,960 | B1 | * | 7/2001 | Watanabe .................... 720/615 |
| 6,310,855 | B1 | * | 10/2001 | Choi ........................... 720/720 |
| 6,512,731 | B1 | * | 1/2003 | Seo et al. .................... 720/656 |
| 6,538,971 | B1 | * | 3/2003 | Seo et al. .................... 720/616 |

FOREIGN PATENT DOCUMENTS

| JP | 05047155 A | * | 2/1993 |
| JP | 10199203 A | * | 7/1998 |

* cited by examiner

*Primary Examiner*—Angel Castro
*Assistant Examiner*—Christopher R. Magee
(74) *Attorney, Agent, or Firm*—David G. Conlin; David A. Tucker; Edwards Angell Palmer & Dodge LLP

(57) ABSTRACT

A disk cartridge 20 for a larger diameter, a disk cartridge 25 for a medium disk diameter, and a disk cartridge 30 for a smaller diameter contains a magneto-optical disk for a larger diameter, a magneto-optical disk for a medium diameter, and a magneto-optical disk for a smaller diameter having different disk diameters, respectively. Each cartridge: the disk cartridge 20 for a larger diameter and the disk cartridge 25 for a medium disk diameter, is provided with at least one sensor hole 6 to recognize a relation in size of a disk diameter with other disk cartridge having a different disk diameter. This makes it possible to provide a disk cartridge and a disk recording and reproducing apparatus which can realize recording and reproducing with high reliability by a single apparatus with respect to disk cartridges, each of which contains a disk-shaped recording medium having a different diameter.

27 Claims, 20 Drawing Sheets

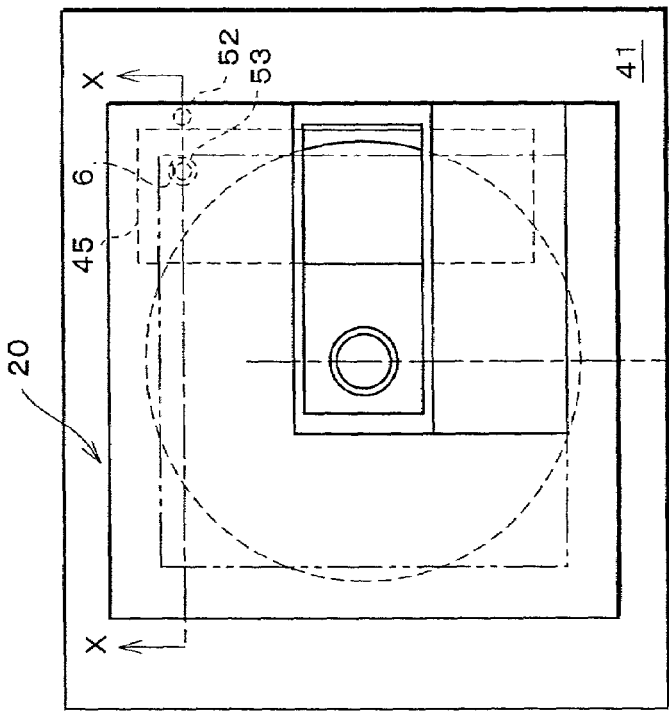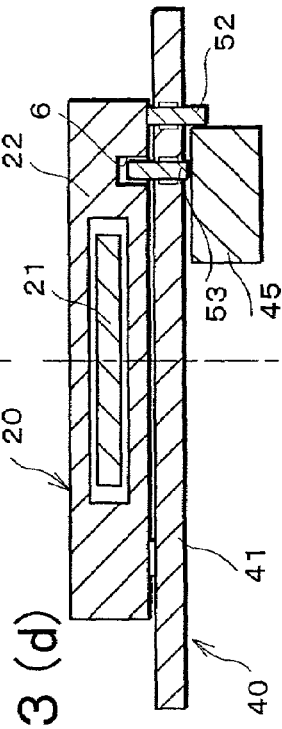
FIG. 3 (a)  FIG. 3 (c)
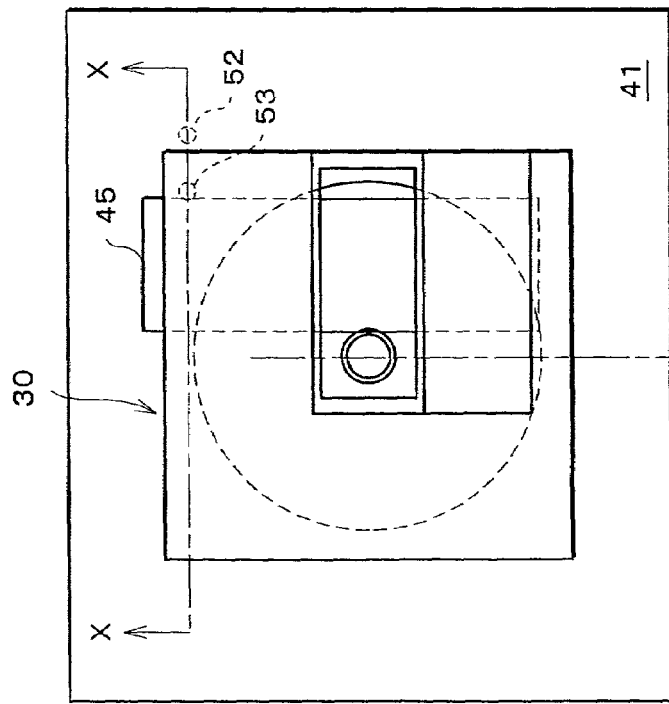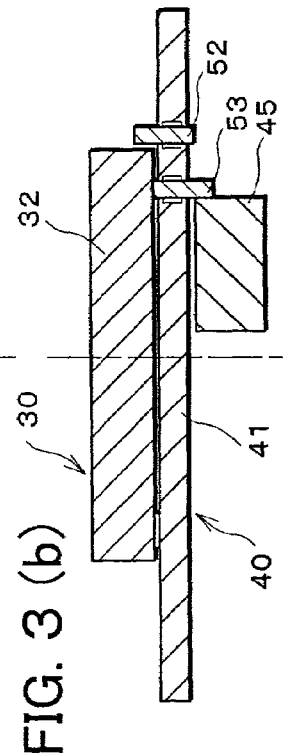
FIG. 3 (b)  FIG. 3 (d)

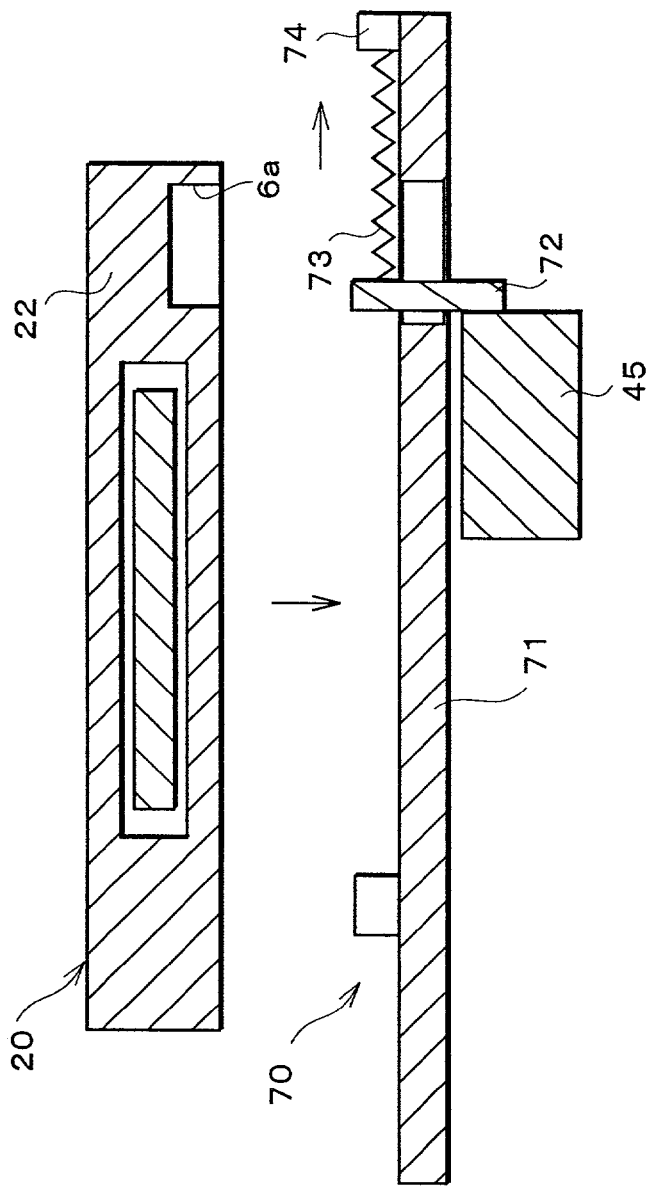
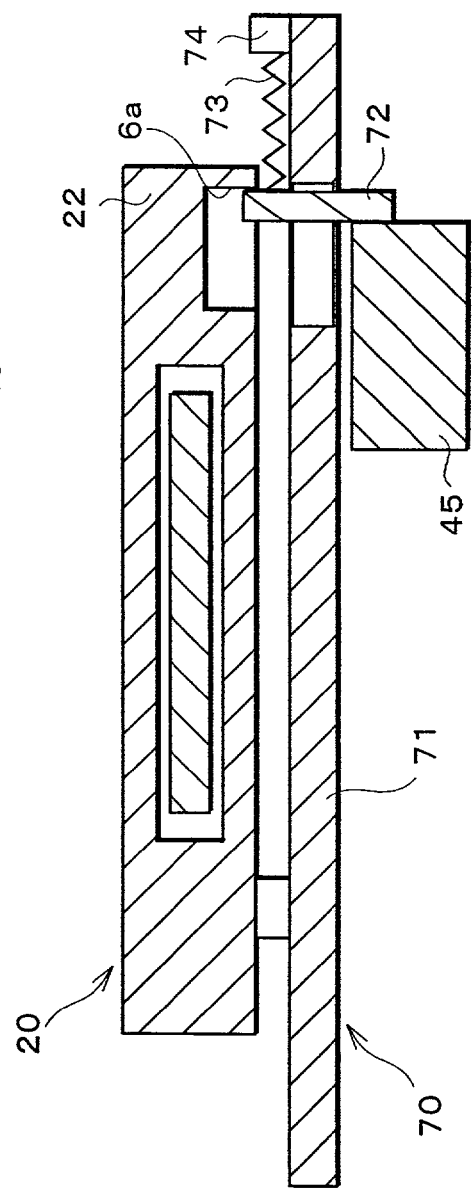
FIG. 11(a)
FIG. 11(b)

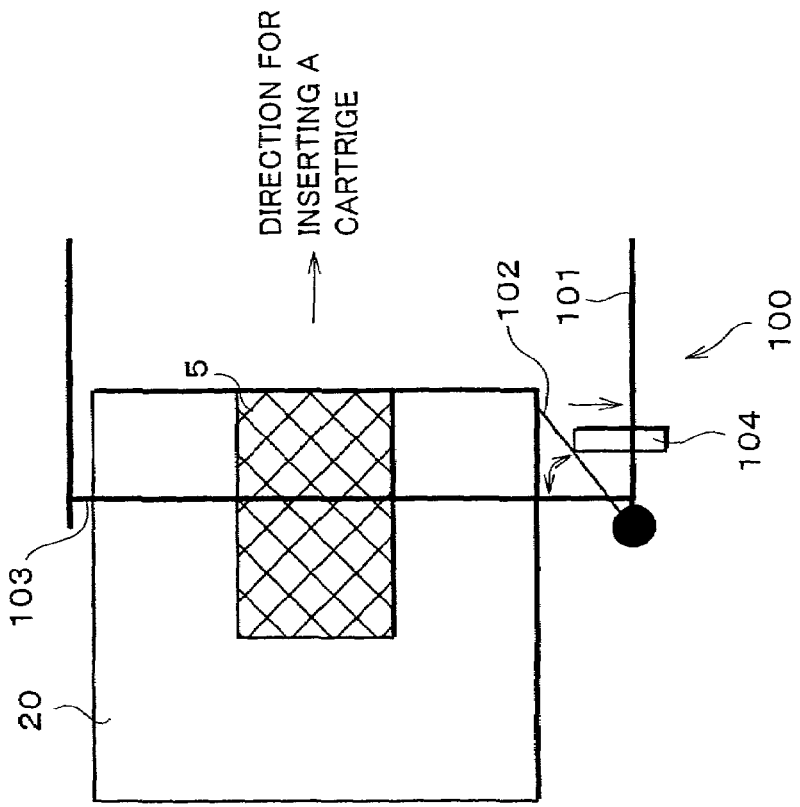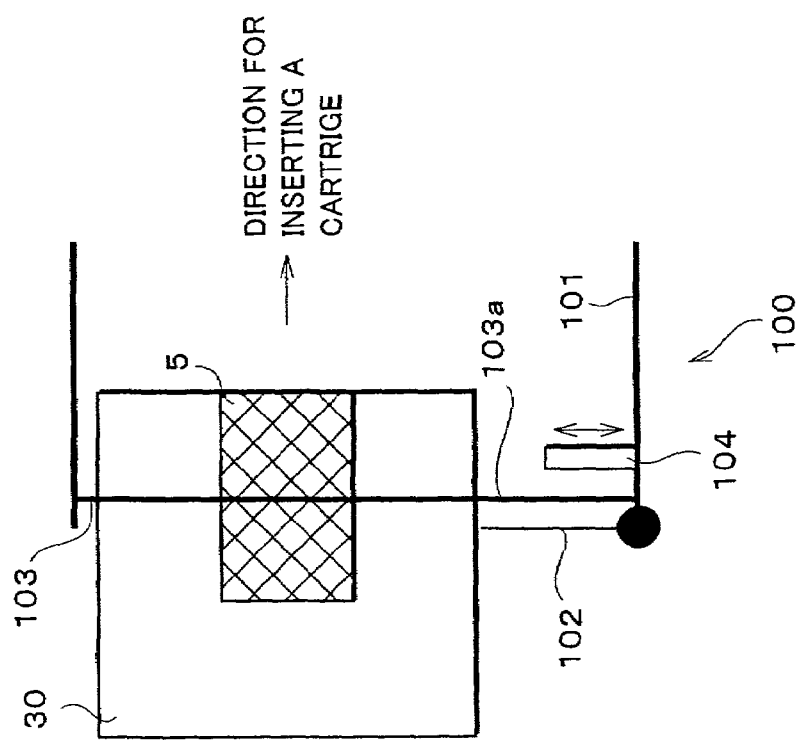

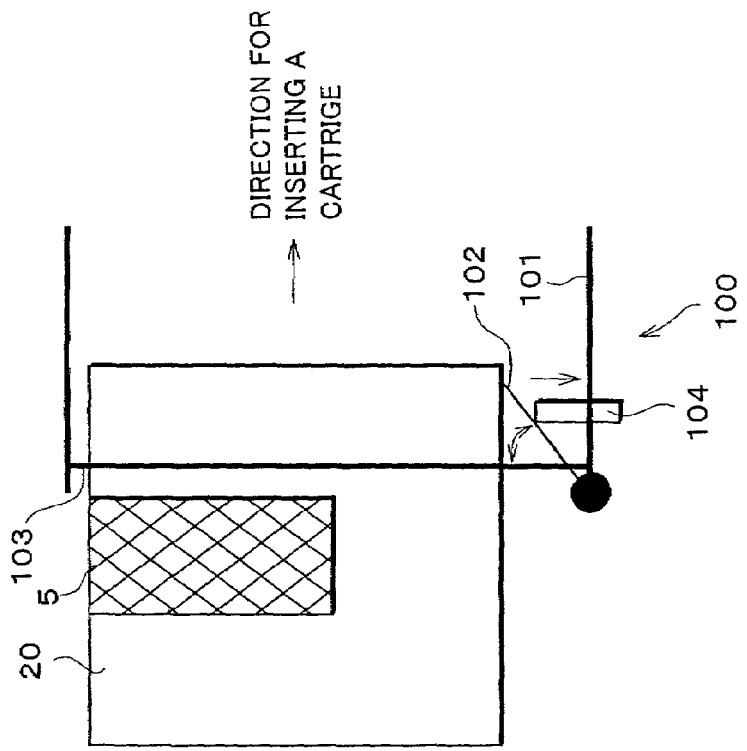
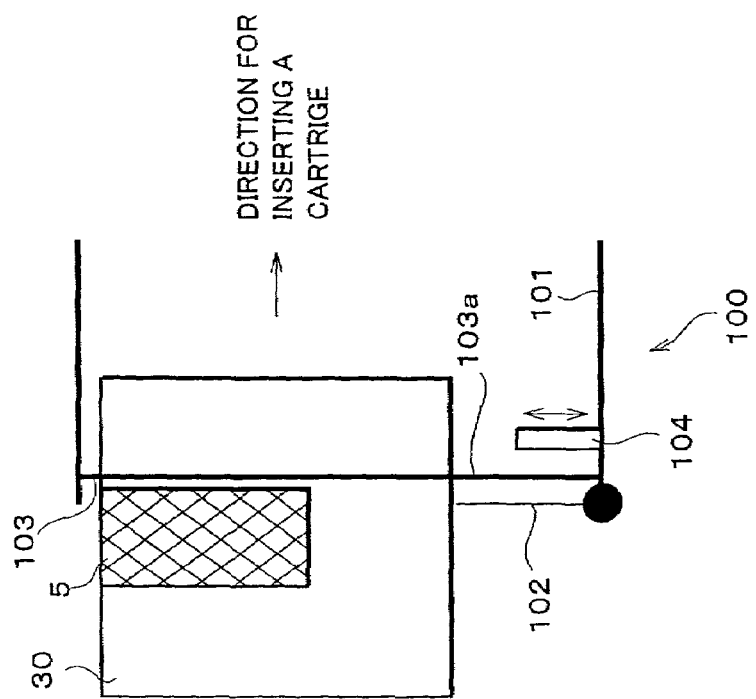

DISK CARTRIDGE AND DISK RECORDING AND REPRODUCING APPARATUS

FIELD OF THE INVENTION

The present invention relates to (a) a disk cartridge which (a) the disk cartridge is used for a disk recording and reproducing apparatus to record and reproduce a disk recording medium which gets caught between an optical pickup and a magnetic head and is arranged to have interchangeability for recording and/or reproducing with respect to two or more types of disk recording media having different disk diameters or cartridge sizes, and (b) a disk recording and reproducing apparatus which records and/or reproduces with respect to the above disk cartridge which has been loaded.

More specifically, the present invention relates to preventing pickup mechanical parts from running out of control outwards from respective disk diameters. Thus, the present invention is effective especially for a disk recording and reproducing apparatus which shares a spindle motor and mechanical parts of the optical pickup so as to have an interchangeability with respect to disks having different diameters.

BACKGROUND OF THE INVENTION

In recent years, an optical disk as a recording medium of a recording and reproducing apparatus has had a lot of variations in such as its recording mode and disk diameter. This is because a recording technique, particularly the fact that laser wavelength has been getting shorter from infrared light to red light and blue light, makes it possible to record and reproduce with a capacity having not less than that of a conventional one even in case of smaller disk diameter than the conventional one.

Variations of disk diameter will be described. For example, as to a compact disk (CD) not having a cartridge, both CDs having disk diameters of 8 cm and 12 cm were easily interchangeable in the same drive. However, since most of recording media were contained within the cartridge in terms of reliability, it was difficult to record and reproduce disk cartridges having different disk diameters in the same recording and reproducing apparatus.

For example, there is a mini disk (MD) as a typical recording medium contained within a cartridge. Since recording media having different disk diameters were not assumed according to the specification of the mini disk, any problem did not arise.

The following will describe the CD apparatus as described above, and a mini disk (MD) apparatus as a typical recording and reproducing apparatus having a magnetic head.

First, as shown in FIG. 18, only if a disk 201 can be loaded in a CD apparatus 200, recording media having different disk diameters do not cause a problem especially in terms of interchangeability because a cartridge does not exist. As is apparent from FIG. 18, even if a pickup housing 202 moves to the outer periphery of the disk 201, no interference between members occurs.

On the other hand, as shown in FIG. 19, a MD apparatus 300 has the arrangement such that a magneto-optical disk 301 gets caught between (a) a pickup housing 302 including an optical pickup (not shown) which projects laser light and (b) a slider 303 including a magnetic head 304 which moves in accordance with laser spotting points. By reversing the direction of a magnetic field generated by the magnetic head 304 in accordance with recording signals, signals are recorded on the magneto-optical disk 301.

Further, the slider 303 including the magnetic head 304 is movable, following a surface shaking of the magneto-optical disk 301, dust, protuberance, and the others on the magneto-optical disk 301. Thus, the magneto-optical disk 301 is prestressed at 3 mN to 10 mN by a suspension 305 which is made up of thin metal in a thickness of 30 $\mu$m to 100 $\mu$m. In addition, one end of the suspension 305 is secured so as to be fixed to a magnetic head arm 306.

An extreme proximity of the magnetic head 304 to the sliding surface of the disk makes it possible to record on the magneto-optical disk 301. If the magnetic head 304 is allowed to be away so as to jump out of the cartridge 307, recording is impossible. The magnetic head 304 is connected to the pickup housing 302 through the magnetic head arm 306 which is horseshoe-shaped. Thus, the pickup housing 302 and the magnetic head 304 are arranged so as to move radially by a pickup feeding mechanism 308 connected with the pickup housing 302 with elements such as screws or gears to drive.

The magnetic head 304, which is called a sliding-type magnetic head, is now used generally in the MD apparatus. Note that, there are also many MD apparatuses in which the magnetic head 304 is lifted up from the inside of the cartridge 307 since the magnetic head 304 is not required in reproducing.

Incidentally, the arrangement is also adopted in many MD apparatuses such that an objective lens 309, which is a part of the optical pickup, is incorporated to the cartridge 307 in order to focus a laser beam. In the case, it is necessary to pay attention to the crash of the cartridge 307 and the objective lens 309 at the time when the pickup housing 302 runs out of control.

For example, as is apparent from FIG. 20, there is the danger that a crash of the slider 303 having the objective lens 309, the suspension 305, and the magnetic head 304 occurs at the periphery of the cartridge 307 when the optical pickup is positioned in the vicinity of the outer most periphery of the magneto-optical disk 301.

Thus, in case where the cartridge 307 containing the magneto-optical disk 301 and a magnetic head 304 of contacting and sliding-type are used for recording, each of the objective lens 309, the suspension 305, and the slider 303 crashes with the cartridge 307 if the movement of the optical pickup excesses the disk diameter of the magneto-optical disk 301. Accordingly, the damage to the magnetic head 304 and the optical pickup is unavoidable. Therefore, in the MD apparatus 300, a housing stopper 310 is generally provided so that the pickup housing 302 cannot move to more the periphery than necessary.

As described before, since in the MD apparatus 300, the objective lens 309 or the slider 303 may crash with the cartridge 307, the housing stopper 310 is generally provided to prevent the crash.

Incidentally, optical disks having various diameters have been in the market in recent years. Use of the same drive device for these optical disks can be realized only in the player which reproduces CDs that do not use cartridges.

Now, with respect to the problem, assuming that disk media having different disk diameter contained in cartridges are recorded and reproduced in a drive device capable of recording and reproducing with a spindle and a single optical pickup, the movable distance of the optical pickup varies depending on respective maximum disk diameters. Therefore, a disk recording and reproducing apparatus, which reproduces with respect to a disk having maximum diameter contained in a cartridge for maximum disk diameter, has a problem that reproduction of a disk having a smaller diameter contained in a cartridge occurs the damage to a suspension for a magnetic head if no measure is taken for the case when the optical pickup runs out of control. Conversely, if the magnetic head is lifted up at the outer periphery so as not to crash with the cartridge in order to solve the above problem, recording in the outer periphery of the disk media having maximum diameter is impossible.

Further, recently there have been some disk recording and reproducing apparatuses which have an arrangement such that a part of an optical pickup is incorporated to a cartridge. The disk recording and reproducing apparatuses of the type have a problem that if disk media having different disk diameters is recorded and reproduced, not a magnetic head, but a part of the optical pickup, for example, an objective lens, or a part of an actuator crashes with the cartridge, thereby causing the damage to a drive apparatus.

That is, it is understandable that both the optical pickup and the magnetic head may damage when the optical pickup runs out of control in the disk recording and reproducing apparatus which secures an interchangeability for the recording media having different disk diameters inserted to the respective cartridges, especially in the state that media with a smaller diameter are loaded to the apparatus.

Further, the disk recording and reproducing apparatus, which is configured so as to use recording media not having cartridges like conventional CDs, is comparatively easy to be available for the disks with different diameters. However, it is a big problem that reliability in recording and reproducing declines by dirt such as dust and finger prints on the surface of the recording media.

SUMMARY OF THE INVENTION

An object of the present invention is to provide a disk cartridge and a disk recording and reproducing apparatus which can realize recording and reproducing with high reliability by a single apparatus by recognizing differences in disk diameter of disk cartridges, each of which contains a disk recording medium having a different diameter.

To achieve the above object, the disk cartridge of the present invention comprises: a first cartridge containing a first disk recording medium, the first cartridge including:

at least one hole for recognizing a relation in size between a disk diameter of a second disk cartridge which contains a second disk recording medium having a different disk diameter and a disk diameter of the first cartridge.

Note that, the present invention assumes that the second disk cartridge may be also provided with at least one hole. Further, the hole may be at the same position as that of the first cartridge or at the different position from that of the first cartridge.

According to this invention, the disk cartridge is provided with holes for recognizing the relation in size of a disk diameter with other disk cartridge containing a disk recording medium having a different disk diameter. The hole makes it possible to recognize the relation in size of disk diameter. As a result, as described later, this makes it possible to stop the pickup moving to the outer periphery more than necessary by restricting the movement range of the pickup in accordance with disk diameters, thereby preventing the damage to the pickup in advance.

Further, at least one hole is provided. That is, for example, it is possible to recognize by one of the holes if, for example, loaded are two types of disk cartridges containing disk recording media having respective different disk diameters.

Still further, it is possible to recognize, for example, by two the holes if loaded are three types of disk cartridges containing disk recording media having respective different disk diameters.

Therefore, it is possible to provide the disk cartridge which can realize recording and reproducing with high reliability by a single apparatus by recognizing differences in disk diameter of disk cartridges, each of which contains a disk recording medium having a different diameter.

To achieve the object, the disk recording and reproducing apparatus of the present invention comprises:

(a) a pickup for recording and reproducing of the disk cartridge, and (b) a restricting member for restricting a movement of the pickup in an outer peripheral direction, which is not less than a predetermined of radius, wherein the restricting member detects disk diameter through the hole and restricts the movement of the pickup in the outer peripheral direction, which is not less than the predetermined of radius.

According to this invention, the disk recording and reproducing apparatus can carry out the recording and reproducing of the disk cartridge containing the cartridge which is provided with the hole.

Here, the present invention includes the restricting member which restricts the movement of the pickup in the outer peripheral direction, which is not less than the predetermined of radius, and the restricting member has functions to detect disk diameter through the hole and to restrict the movement of the pickup in the outer peripheral direction, which is not less than the predetermined of radius.

Thus, the restricting member makes it possible to detect the hole with which each cartridge is provided. Also, it is possible to stop the pickup moving in the outer periphery more than necessary by restricting the movement range of the pickup in accordance with disk diameters, thereby preventing the damage to the pickup in advance.

As a result, it is possible to provide the disk recording and reproducing apparatus which can realize recording and reproducing with high reliability by such a single apparatus by recognizing differences in disk diameter of disk cartridges, each of which contains a disk recording medium having a different diameter.

To achieve the object, the disk recording and reproducing apparatus of the present invention comprises:

a pickup recording and reproducing the disk cartridge described above, the apparatus having a structure in which length of the hole is detected so as to mechanically define a movable outer peripheral position of the pickup.

According to this invention, it is arranged so as to detect the length of the hole and to mechanically define a movable outer peripheral position of the pickup.

With this, the lengths of the holes move with the outer most peripheral position during the movement of the pickup. It is, therefore, possible to prevent the damage to the pickup when the pickup runs out of control, and it is also possible to relatively easily secure the interchangeability between the apparatuses with respect to two or more types of disk recording media having respective different disk diameters.

To achieve the object, the disk recording and reproducing apparatus of the present invention comprises:

a pickup that carries out recording and reproducing with respect to the disk cartridge described above, and a chassis including a single restricting pin, provided so as to be movable radially and to contact with the pickup, which is inserted to the hole of each of the cartridges in loading.

According to this invention, the chasis is provided with one restricting pin which is inserted to the hole of each of the cartridges in loading and which is provided so as to be movable radially and to contact with the pickup.

With this, the lengths of the holes move with the outer most peripheral position during the movement of the pickup. It is, therefore, possible to prevent the damage to the pickup when the pickup runs out of control, and it is also possible to relatively easily secure the interchangeability between the apparatuses with respect to two or more types of disk recording media having respective different disk diameters.

To achieve the object, the disk recording and reproducing apparatus comprises:

(a) a pickup for carrying out recording and reproducing with respect to disk cartridges, each of which contains a disk recording medium having respective different disk diameters, and (b) a chassis, including:

a restricting member which presses a side wall of the cartridge and contacts with the pickup when the disk cartridge is loaded to restrict a movement of the pickup in an outer peripheral direction, which is not less than a predetermined of radius.

According to this invention, restricting means restricts the movement amount of the pickup in accordance with the size of the loaded disk cartridge.

With this, it is possible that the restricting means contacts with the pickup to restrict the movement of the pickup in an outer peripheral direction, which is not less than the predetermined of radius, thereby preventing the damage to the pickup when its running out of control.

As a result, it is possible to provide the disk recording and reproducing apparatus which can realize recording and reproducing with high reliability by such a single apparatus by recognizing differences in disk diameter of disk cartridges, each of which contains a disk recording medium having a different diameter.

To achieve the object, the disk recording and reproducing apparatus of the present invention comprises:

(a) a pickup for carrying out recording and reproducing with respect to disk cartridge, each of which contains a disk recording medium having different disk diameters, and (b) restricting means for restricting movement amount of the pickup in accordance with a size of the loaded disk cartridge.

According to this invention, restricting means restricts the movement amount of the pickup in accordance with the size of the loaded disk cartridge.

With this, it is possible that the restricting means contacts with the pickup to restrict the movement of the pickup in an outer peripheral direction, which is not less than the predetermined of radius, thereby preventing the damage to the pickup when its running out of control.

As a result, it is possible to provide the disk recording and reproducing apparatus which can realize recording and reproducing with high reliability by such a single apparatus by recognizing differences in disk diameter of disk cartridges, each of which contains a disk recording medium having a different diameter.

For a fuller understanding of the nature and advantages of the invention, reference should be made to the ensuing detailed description taken in conjunction with the accompanying drawings.

BRIEF DESCRIPTION OF THE DRAWINGS

FIG. 3(a) is a plan view illustrating the state of the disk cartridge for a smaller diameter loaded, FIG. 3(b) is a sectional view of FIG. 3(a) along line X—X, FIG. 3(c) is a plan view illustrating the state of the disk cartridge for a larger diameter loaded, and FIG. 3(d) is a sectional view of FIG. 3(c) taken along a line X—X.

FIG. 9(a) is a plan view illustrating the state of the disk cartridge for a smaller diameter loaded.

FIG. 11(a) is a sectional view illustrating before the disk cartridge for a larger diameter is loaded, and FIG. 11(b) is a sectional view illustrating after the disk cartridge for a larger diameter is loaded.

FIG. 16(a) is a view illustrating a disk cartridge of still a further embodiment according to the present invention, and more specifically, FIG. 16(a) is a plan view illustrating the state of the disk cartridge for a smaller diameter being inserted, FIG. 16(b) is a plan view illustrating the state of the disk cartridge for a larger diameter being inserted.

FIG. 17(a) is a plan view illustrating the state of the disk cartridge for a smaller diameter of which orientation is changed being inserted and FIG. 17(b) is a plan view illustrating the state of the disk cartridge for a larger diameter of which orientation is changed being inserted.

DESCRIPTION OF THE EMBODIMENTS (Embodiment 1)

Referring to FIG. 1 through FIG. 8, the following will describe an embodiment of the present invention. Note that, in the embodiment, a disk recording and reproducing apparatus such as a magneto-optical disk recording and reproducing apparatus, represented by a MD apparatus, is configured in such that a disk recording medium gets caught between an optical pickup and a magnetic head to carry out recording and reproducing. It should be noted that the apparatus to be adapted is not necessarily limited to the apparatus in the embodiment as far as the recording and reproducing is carried out with respect to a disk recording medium contained in a cartridge. Further, the disk recording medium is not limited to a magneto-optical disk, and an optical disk can be adopted. Still Further, the present invention covers not only the disk recording and reproducing apparatus which carries out both the recording and reproducing, but also an apparatus which has either function of recording or reproducing.

In the magneto-optical disk recording and reproducing apparatus of the present embodiment, for example, two types of disks having different diameters: a disk for a larger diameter contained in a disk cartridge for such a larger diameter and a disk having a smaller diameter contained in a disk cartridge having such a smaller diameter can be loaded into the apparatus to be recorded and reproduced.

Figure 2:
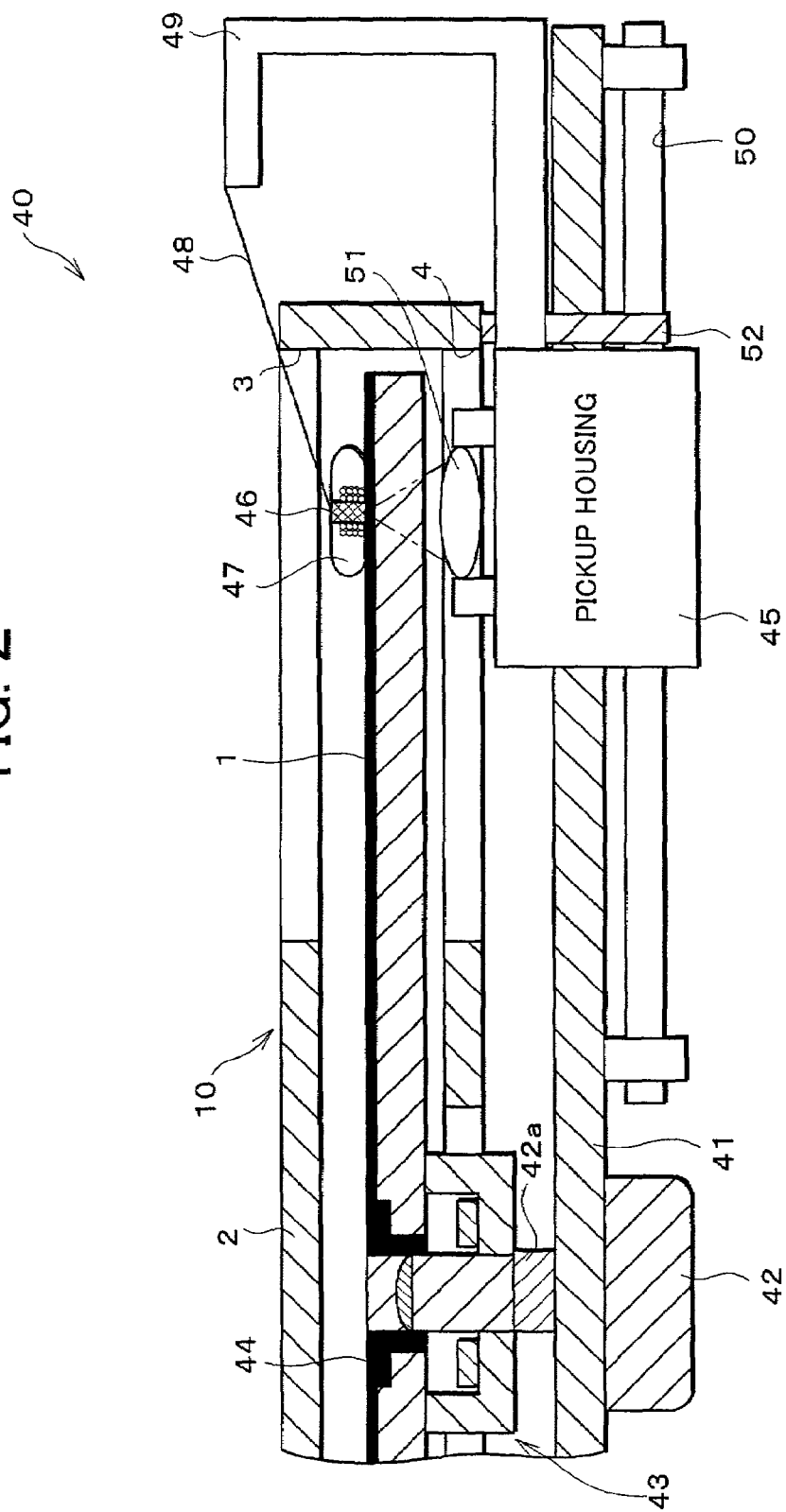
FIG. 2 is a sectional view illustrating a specific arrangement of the disk cartridge and the magneto-optical disk recording and reproducing apparatus.

More specifically, as shown in FIG. 2, a magneto-optical recording and reproducing apparatus 40 is provided with a spindle motor 42 substantially in the center position of a mechanical chassis 41 (a chassis). A turn table 43 is provided on the top part of a turn shaft 42a (a disk center of the spindle motor 42). Thus, an optical disk 1 as a disk-state recording medium contained in a cartridge 2 of a disk cartridge 10 gets caught between the turn table 43 and a center hub 44, thereby rotating the optical disk 1 by the rotation of the spindle motor 42.

A pickup housing 45 as a pickup having an optical pickup (not shown) which irradiates laser light is provided on the lower side of the magneto-optical disk 1. Meanwhile, a slider 47 having a magnetic head 46, which moves in accordance with a laser spotting position is disposed on the upper side of the magneto-optical disk 1. Signals are recorded on the magneto-optical disk 1 by reversing the direction of the magnetic field generated by the magnetic head 46 in accordance with a recording signal.

Further, the magneto-optical disk 1 is prestressed at 3 mN to 10 mN by a suspension 48 which is made up of thin metal about in a thickness of 30 μm to 100 μm so that the slider 47 having the magnetic head 46 is movable, following a surface shaking of the magneto-optical disk 1, dust, protuberance, and the others on the magneto-optical disk 1. In addition, one end of the suspension 48 is secured so as to be fixed to a magnetic head arm 49.

An extreme proximity of the magnetic head 46 to the sliding surface of the disk makes it possible to carry out the recording on the magneto-optical disk 1. If the magnetic head 46 is allowed to be away so as to jump out of the cartridge 2, the recording is impossible. The magnetic head 46 is connected to the pickup housing 45 through the magnetic head arm 49 which is horseshoe-shaped. Thus, the pickup housing 45 and the magnetic head 46 are arranged so as to move radially by a pickup feeding mechanism 50 connected with the pickup housing 45 with elements such as screws or gears. More specifically, the magnetic head 46 of the magneto-optical disk recording and reproducing apparatus 40 according to the present embodiment is a sliding-type magnetic head. Note that, the magnetic head 304 can be lifted up from the inside of the cartridge 2 since the magnetic head 46 is not required in reproducing.

Further, the magneto-optical disk recording and reproducing apparatus 40 according to the present embodiment has an arrangement such that an objective lens 51, which is a part of the optical pickup, is incorporated into the cartridge 2 in order to focus a laser beam. In the case, it is necessary to pay attention to the crash of the cartridge 2 and the objective lens 51 at the time when the pickup housing 45 runs out of control.

As shown in FIG. 3(a) and FIG. 3(b), the magneto-optical disk recording and reproducing apparatus 40 of the present embodiment has an arrangement such that the pickup housing 45 cannot move to the periphery more than necessary in the vicinity of the outer most periphery of the disk cartridge 20 for a larger diameter, which is one type of the disk cartridges 10. More specifically, as shown in FIG. 3(a) and FIG. 3(b), a housing stopper pin for a larger diameter disk 52 (herein after referred to as "stopper pin for a larger diameter") acting as a restricting member and a restricting pin is provided, and a housing stopper pin 53 for a smaller diameter disk (herein after referred to as "stopper pin for a smaller diameter") acting as a restricting member and a restricting pin is provided at the inside of the stopper pin for a larger diameter 52.

The following will specifically describe the disk cartridge 10 of the present embodiment which is loaded to the magneto-optical disk recording and reproducing apparatus 40 having the stopper pin 52 for a larger diameter and the stopper pin 53 for a smaller diameter so as to be recorded and reproduced.

Figure 4:
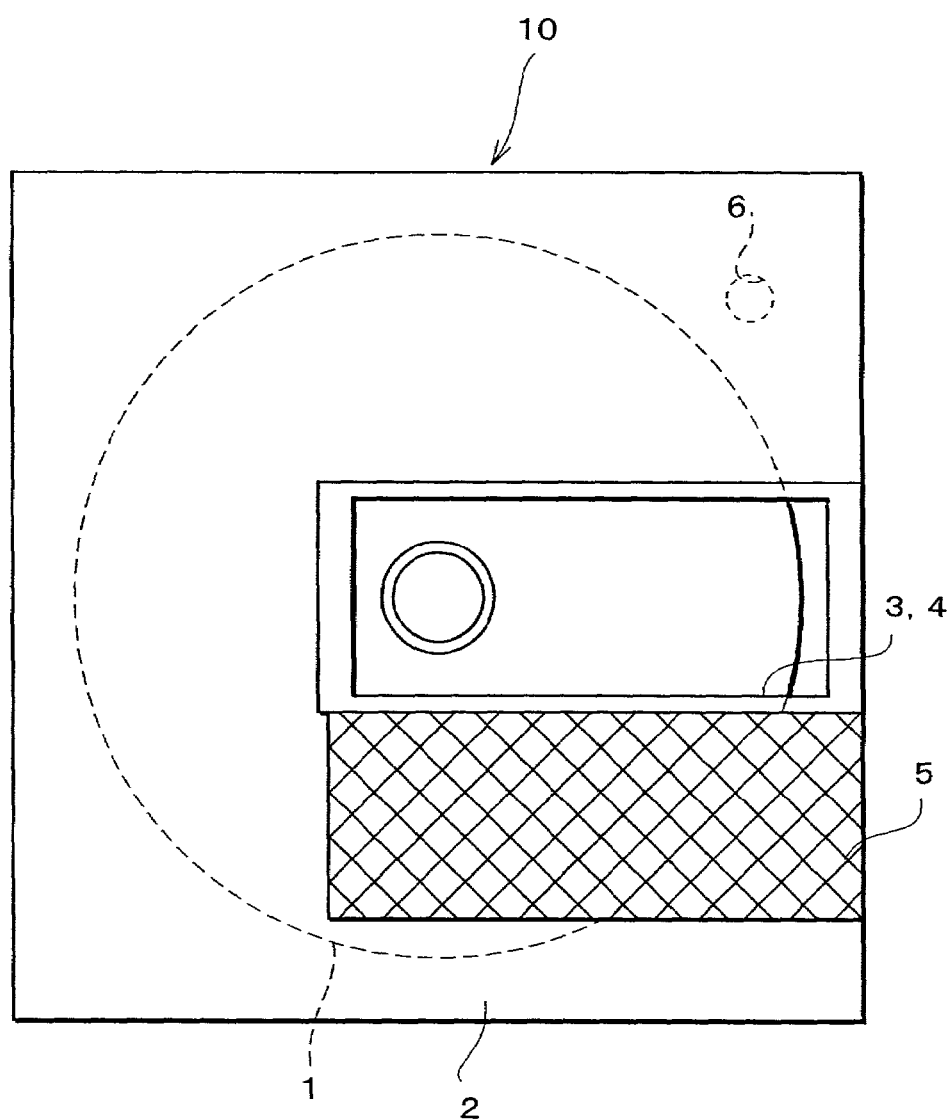
FIG. 4 is a plan view illustrating the disk cartridge.
Figure 5:
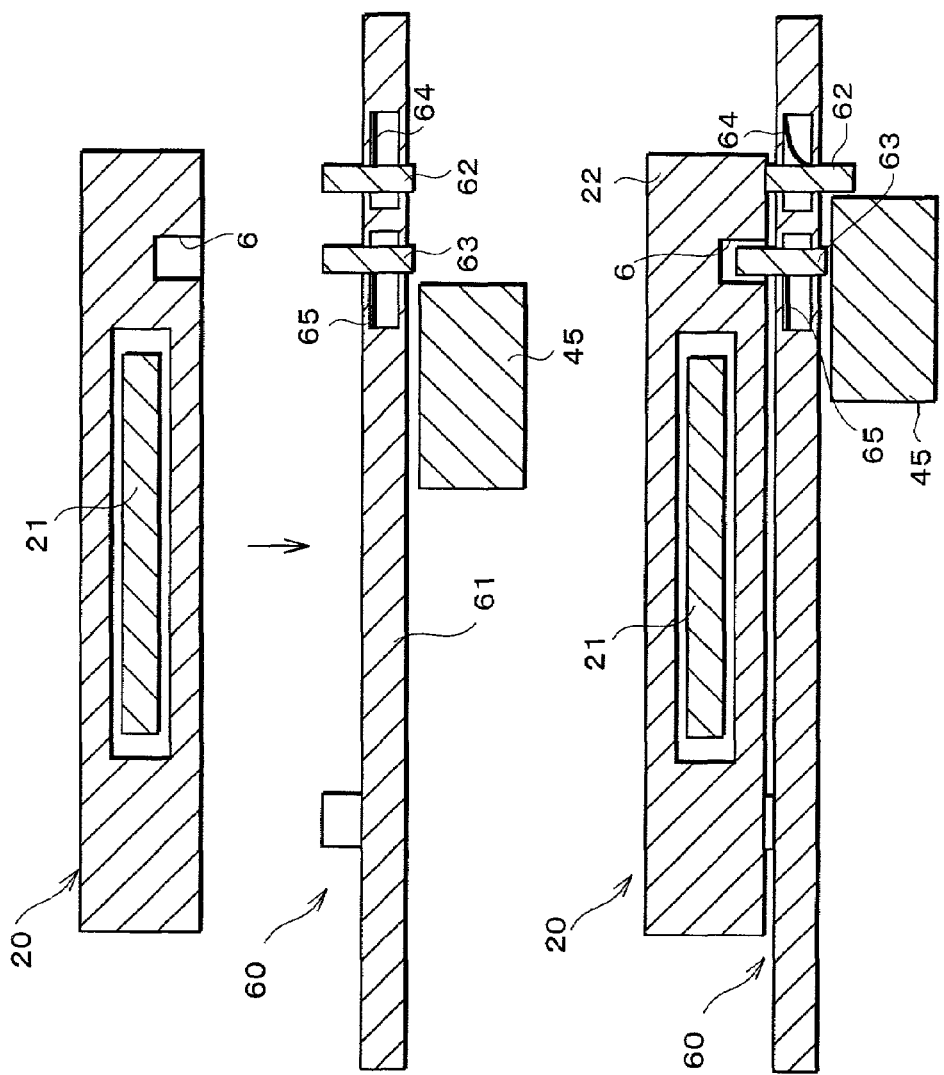
FIG. 5(a) is a sectional view illustrating the state before the disk cartridge for a larger diameter is loaded.
FIG. 5(b) is a sectional view illustrating the state after the disk cartridge for the larger diameter is loaded.

As shown in FIG. 4, the disk cartridge 10 has the cartridge 2 in which the magneto-optical disk 1 for recording information signals is contained. The upper surface and lower surface of the cartridge 2 are provided with an upper side opening 3 facing the magnetic head 46 and a lower side opening 4 facing the spindle motor 42 and a pickup unit, respectively. Further, the upper surface and lower surface of the cartridge 2 are provided with a shutter 5 to close and open the upper surface opening 3 and the lower surface opening 4. Except when the recording and reproducing is carried out, the shutter 5 is closed.

In the present embodiment, the cartridge 2 is provided with a sensor hole 6 as a hole, indicating a disk diameter of the contained magneto-optical disk 1 or the outer most periphery during the movement of the optical pickup.

The sensor hole 6 is provided so that all of the cartridges 2 containing their magneto-optical disks 1 having respective different diameters have a same coordinate position or a same radial position with respect to the disk center of the magneto-optical disk recording and reproducing apparatus 40, regardless of size of disk diameter of each magneto-optical disk 1 and size of the cartridges 2, thereby ensuring the interchangeability among the cartridges 2. That is, these positions are the absolute positions with respect to the disk center of the magneto-optical disk recording and reproducing apparatus 40.

Note that, the disk center of the magneto-optical disk recording and reproducing apparatus 40 does not change, and each of the magneto-optical disks 1 having respective different disk diameters are loaded on the concentric circle around the disk center. Further, the sensor hole 6 is usually provided at the same coordinate position. However, the position is not limited to this. It is possible to detect and restrict the outer most periphery during the movement of the pickup housing 45 if the sensor hole 6 is provided at the same radial position as described above.

Therefore, as described later, it is possible to identify whether the size of each disk diameter is larger or smaller in accordance with the presence or absence of the sensor hole 6. Note that it is also possible to detect that the sensor hole 6 is absent, by providing a detection sensor so that it is existed at places other than a surface of projection of the cartridge.

Further, circle is adopted for the shape of the sensor hole 6 in the present embodiment. Note that, the shape is not necessarily limited to circle. Polygon such as triangle and square, ellipse, and the other can be adopted. In addition, as described in Embodiment 2, the shape of the sensor hole 6 can be formed long. Yet further, the thickness of the cartridge 2 increases in proportion to the size of the disk diameter. The depth of the center hole 6 is, therefore, established in consideration of the stroke of each stopper pin 53 for a smaller diameter.

Next, the following will describe the operation of the magneto-optical disk recording and reproducing apparatus 40 which is so arranged as to detect disk diameter in accordance with presence or absence of the sensor hole 6.

As shown in FIG. 3(c) and FIG. 3(d), the disk cartridge 20 for a larger diameter of the present embodiment is provided with the sensor hole 6 indicating diameters of a magneto-optical disk 31 for a smaller diameter and a magneto-optical disk 21 for a larger diameter. On the other hand, as shown in FIG. 3(a) and FIG. 3(b), the disk cartridge 30 for a smaller disk diameter is not provided with the sensor hole 6.

The sensor holes 6 are set at the same position with respect to the center of the turn table 43 or the magneto-optical disk 1 such that the sensor holes 6 can be detected in the same drive. This makes it possible to detect the disk diameter in accordance with presence or absence of the sensor hole 6.

That is, as shown in FIG. 3(c) and FIG. 3(d), the sensor hole 6 is made on the rear side of the cartridge 22 of the disk cartridge 20 for a larger diameter. Meanwhile, the stopper pin 53 for a smaller diameter is provided at the position facing to the sensor hole 6 on the mechanical chassis 41 of the magneto-optical disk recording and reproducing apparatus 40. Further, as described later, the stopper pin 53 for a smaller diameter is energized upward so as to be projected from the mechanical chassis 41. However, downward projection from the mechanical chassis 41 is small. Accordingly, the pickup housing 45 is movable under the stopper pin 53 for a smaller diameter in the radial direction of the magneto-optical disk 21 for a larger diameter without being affected by the stopper pin 53 for a smaller diameter.

As described above, since the disk cartridge 20 for a larger diameter is provided with the sensor hole 6, the stopper pin 53 for a smaller diameter goes into the sensor hole 6 when the disk cartridge 20 for a larger diameter is loaded to the magneto-optical disk recording and reproducing apparatus 40. As a result, the pickup housing 45 can move outward from the stopper pin 53 for a smaller diameter and contacts with the stopper pin 52 for a larger diameter so as to stop moving outward from the stopper pin 52 for maximum diameter.

More specifically, since the stopper pin 53 for a smaller diameter goes into the sensor hole 6, the pickup housing 45 can move to the edge of the disk diameter of the magneto-optical disk 21 for a larger diameter or to the outer most periphery during the movement of the pickup housing 45. As a result, it can be said that the sensor hole 6 is designed to indicate the disk diameter of the magneto-optical disk 21 or the outer most periphery during the movement of the pickup.

Next, described is the case where the disk cartridge 30 for a smaller diameter is loaded to the magneto-optical disk recording and reproducing apparatus 40.

In the case, as shown in FIG. 3(a) and FIG. 3(b), since the cartridge 32 of the disk cartridge 30 for a smaller diameter is not provided with the sensor hole 6, the stopper pin 53 for a smaller diameter is urged by the cartridge 32 to project downward. With this, the pickup housing 45 contacts with the stopper pin 53 for a smaller diameter so as to stop moving outward from the stopper pin 53 for a smaller diameter.

That is, it can be said that the position of the sensor hole 6 is designed to indicate the disk diameter of the magneto-optical disk 31 for a smaller diameter in the cartridge 30 for a smaller diameter disk or the outer most periphery during the movement of the pickup.

As a result, the magneto-optical disk recording and reproducing apparatus 40 of the present embodiment detects differences in disk diameter by the sensor hole 6. Further, the magneto-optical disk recording and reproducing apparatus 40 of the present embodiment has an arrangement such that the drive device (not shown) makes the stopper pin 53 for a smaller diameter or the stopper pin 52 for a larger diameter projected from predetermined radial positions in accordance with disk diameters so that the pickup housing 45 cannot move more outward than necessary, thereby preventing the damage to the magnetic head 46 and optical parts at the time when the pickup housing 45 runs out of control.

These stopper pin 53 for a smaller diameter and stopper pin 52 for a larger diameter switch a stopping position with respect to the magneto-optical disk 21 for a larger diameter and a stopping position with respect to the magneto-optical disk 31 for a smaller diameter, in accordance with a loaded state of the disk cartridge which varies depending on information from the sensor hole 6 of the disk cartridge 10.

As described above, the measure can be taken for preventing the damage to the drive device in advance since the disk cartridge 10 is provided with the sensor hole 6 to detect disk diameters of the loaded magneto-optical disk 1: the magneto-optical disk 21 for a larger diameter or the magneto-optical disk 31 for a smaller diameter.

Note that, in the present embodiment, the stopper pin 52 for a larger diameter and the stopper pin 53 for a smaller diameter are used both as a detecting sensor for disk diameter and a stopper pin. However, the arrangement is not necessarily limited to this; for example, an arrangement such that a sensor and a stopper pin are different mechanisms can be adopted.

Figure 6:
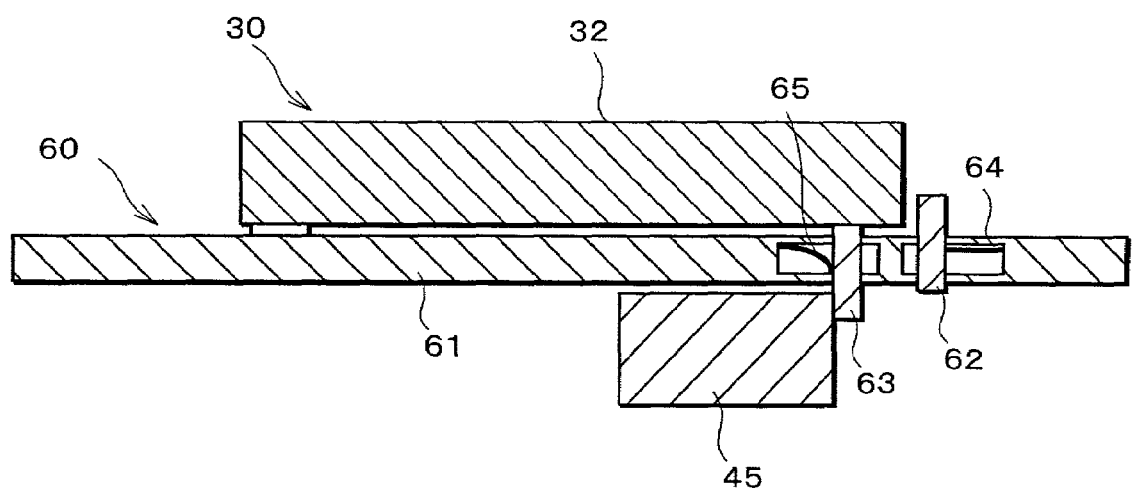
FIG. 6 is a sectional view illustrating the state after the disk cartridge for a smaller diameter is loaded.

In such an arrangement, for example, as shown in FIG. 5(a), FIG. 5(b), and FIG. 6, it is possible to be arranged so as to detect disk diameter in accordance with presence or absence of the sensor hole 6.

That is, as shown in FIG. 5(b), a magneto-optical disk recording and reproducing apparatus 60 can have an arrangement such that spring 64 and spring 65 (an elastic material) are respectively provided for causing a stopper pin 62 for a larger diameter and a stopper pin 63 for a smaller diameter in a mechanical chassis 61 (a chassis) to press upward. Note that, in the case, an arrangement can be also such that is the disk cartridge 30 for a smaller diameter is not provided with the sensor hole 6 at the position where the disk cartridge 20 for a larger diameter is provided with the sensor hole 6.

As shown in FIG. 5(a), when the disk cartridge 20 for a larger diameter is loaded to the magneto-optical disk recording and reproducing apparatus 60, the stopper pin 63 for a smaller diameter goes into the sensor hole 6, and the stopper pin 62 for a larger diameter is urged by the cartridge 22 of the disk cartridge 20 for a larger diameter to project downward from the mechanical chassis 61 against the force from the spring 64. As a result of this, the pickup housing 45 contacts with the stopper pin 62 for a larger diameter so as to stop moving outward from the stopper pin 62.

On the other hand, as shown in FIG. 6, when the disk cartridge 30 for a smaller diameter is loaded, the stopper pin 63 for a smaller diameter exists in the surface of projection of the cartridge 32. With this, the stopper pin 63 for a smaller diameter is urged by the cartridge 32 of the disk cartridge 30 for a smaller diameter to project downward from the mechanical chassis 61. Accordingly, the stopper pin 63 for a smaller diameter stops the pickup housing 45 moving outward. Note that, at this time, the stopper pin 62 for a smaller diameter, which exists outside the projection of the cartridge 32, is not pressed by the cartridge 32; therefore, the stopper pin 62 for a larger diameter keeps projecting upward by the spring 64.

That is, in the magneto-optical disk recording and reproducing apparatus 60, the lower surfaces of the cartridge 22 and the cartridge 32 of the respective magneto-optical disk 21 for a larger diameter and magneto-optical disk 31 for a smaller diameter push the upper surfaces of the stopper pin 62 for a larger diameter and the stopper pin 63 for a smaller diameter. This causes the stopper pin 62 for a larger diameter and the stopper pin 63 for a smaller diameter to project toward the pickup housing 45 side, thereby restricting an outer periphery movement distance of the pickup housing 45.

Figure 7A:
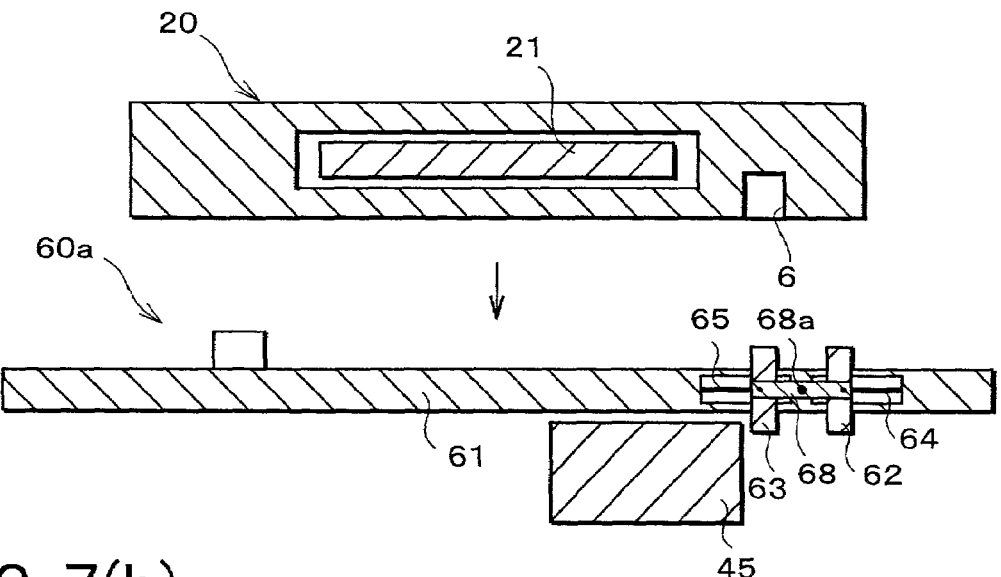
FIG. 7(a), FIG. 7(b), and FIG. 7(c) are sectional views illustrating each state of the magneto-optical recording and reproducing apparatus arranged in such manner that a stopper pin for a smaller diameter and a stopper pin for a larger diameter are provided in a seesaw system.
Figure 7B:
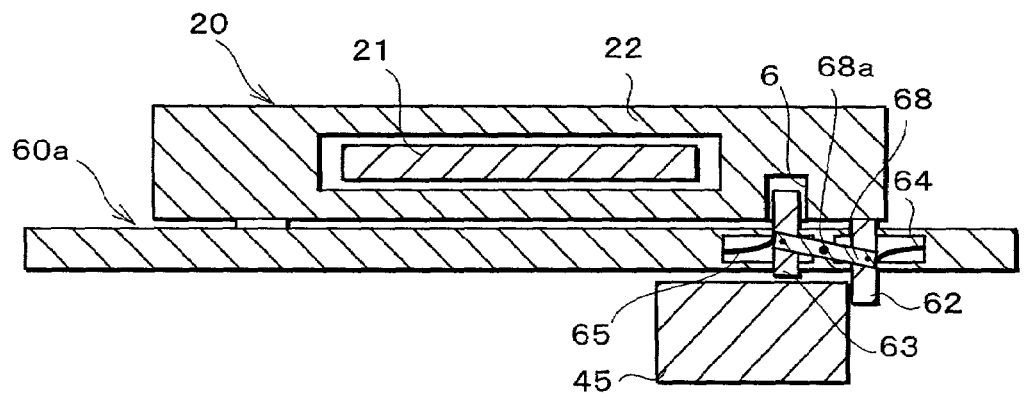
Figure 7C:
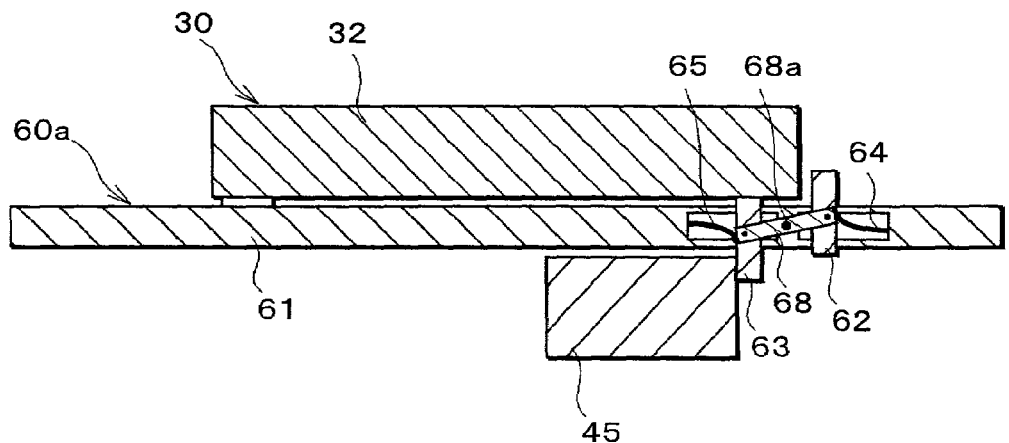

Note that, the magneto-optical disk recording and reproducing apparatus 60 have an arrangement such that each of the stopper pin 62 for a larger diameter and the stopper pin 63 for a smaller diameter independently move up and down. However, the present invention is not limited to this. For example, as shown in FIG. 7(a), FIG. 7(b), and FIG. 7(c), a magneto-optical disk recording and reproducing apparatus 60a can have an arrangement such that the stopper pin 62 for a larger diameter and the stopper pin 63 for a smaller diameter move in a seesaw manner.

More specifically, a connecting board 68 is provided by a hinge mechanism between the stopper pin 62 for a larger diameter and the stopper pin 63 for a smaller diameter, and a rotation center 68a is provided at the center of the connecting board 68. Thus, the stopper pin 62 for a larger diameter and the stopper pin 63 for a smaller diameter move in the seesaw manner in which one side lifts up while the other side is pushed down. In the magneto-optical disk recording and reproducing apparatus 60a, as shown in FIG. 7(a), in case where the cartridge 22 and 23 are not loaded to the mechanical chassis 61, the stopper pin 62 for a larger diameter and the stopper pin 63 for a smaller diameter are projected out by little from the upper and lower surfaces of the mechanical chassis 61. However, as shown in FIG. 7(b) and FIG. 7(c), in case where the cartridge 32 and the cartridge 22 are loaded, each of the stopper pin 62 for a larger diameter and the stopper pin 63 for a smaller diameter moves up and down in the seesaw manner. Accordingly, it is possible to stop the movement of the pickup housing 45. Thus, in case of two types of disk cartridges having different disk diameters, the seesaw type is applicable.

Figure 8:
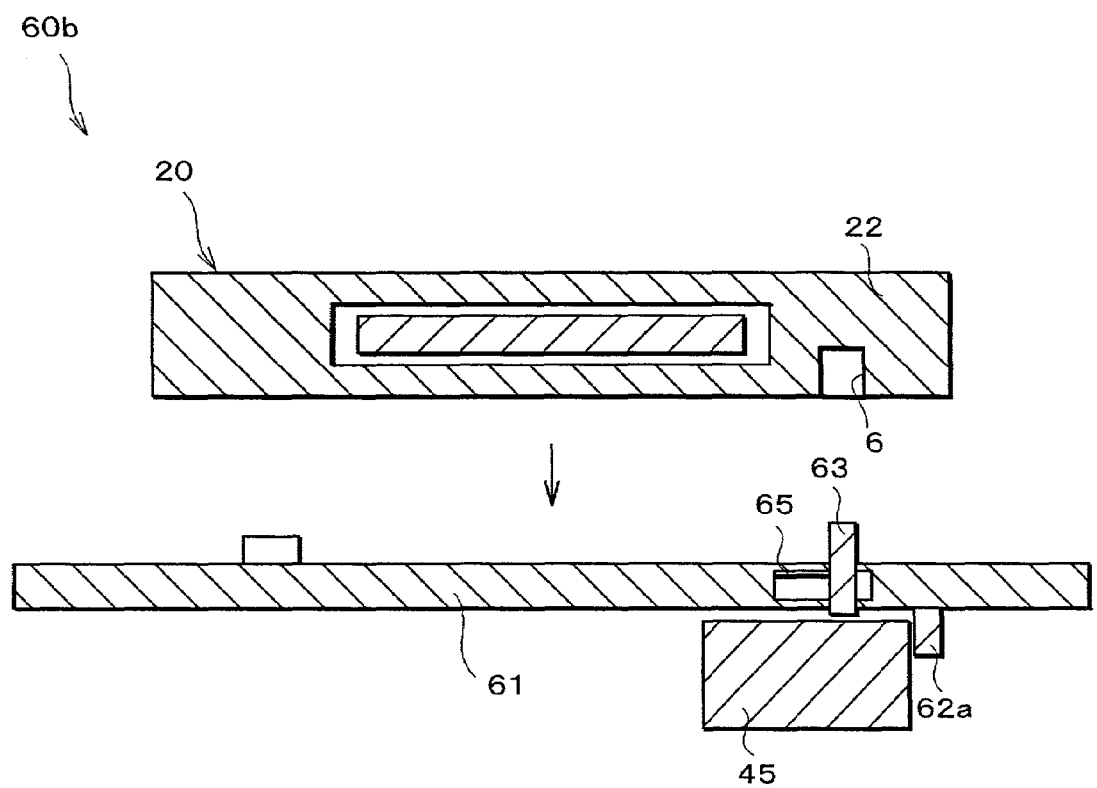
FIG. 8 is a sectional view illustrating the magneto-optical disk recording and reproducing apparatus arranged in such manner that the stopper pin for a smaller diameter is energized by a spring while the stopper pin for a larger diameter is fixed.

Further, in the magneto-optical disk recording and reproducing apparatus 60 and the magneto-optical disk recording and reproducing apparatus 60a, the stopper pin 62 for a larger diameter is capable of moving up and down from the mechanical chassis 61 by the spring 64. However, the present invention is not necessarily limited to this. For example, as shown in FIG. 8, a magneto-optical disk recording and reproducing apparatus 60b of a fixed-type can be arranged so that a stopper pin 62a for a larger diameter has been projected downward from the mechanical chassis 61 without using the spring 64.

Here, the magneto-optical disk recording and reproducing apparatuses 40, 60, 60a and 60b were capable of recording and reproducing two types of disk cartridges: the disk cartridge 20 for a larger diameter and the disk cartridge 30 for a smaller diameter each of which has a different disk diameter. However, with use of the above system, realized is a magneto-optical disk recording and reproducing apparatus 60c which can record and reproduce three types of disk cartridges 10: the disk cartridge 20 for a larger diameter, a disk cartridge 25 for a medium diameter, and the disk cartridge 30 for a smaller diameter.

Figure 1A:
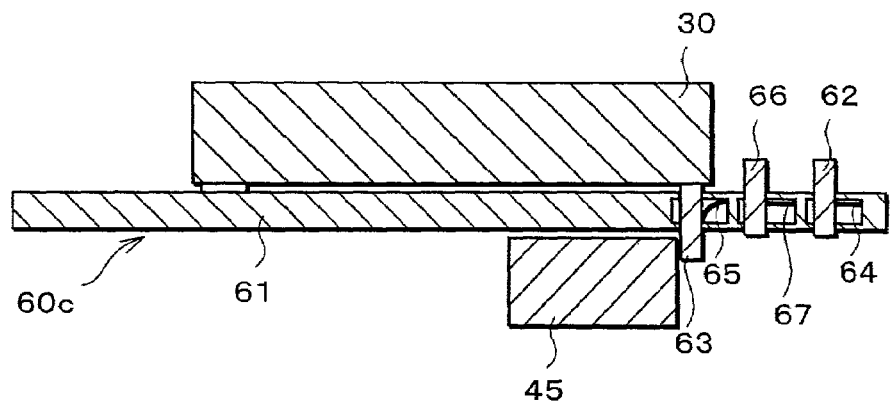
FIG. 1(a) is a view illustrating a disk cartridge and a magneto-optical disk recording and reproducing apparatus of one embodiment according to the present invention, and more specifically, is a sectional view illustrating the state of a disk cartridge for a smaller diameter loaded.
Figure 1B:
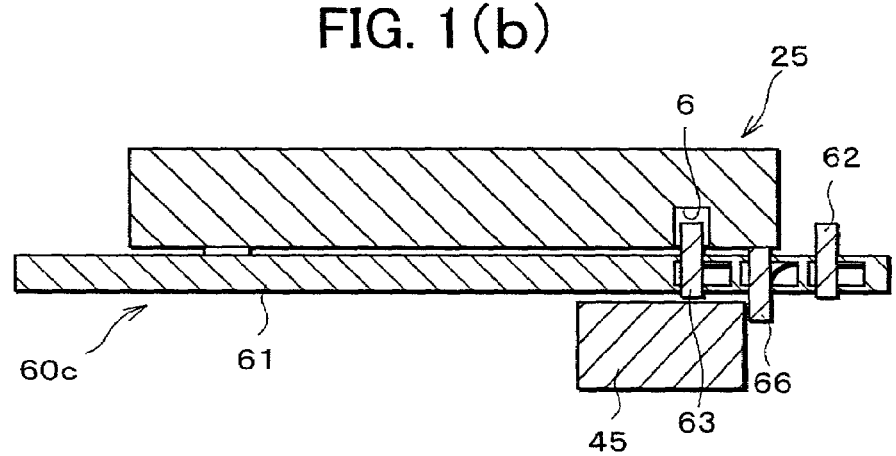
FIG. 1(b) is a sectional view illustrating the state of a disk cartridge for a medium diameter loaded.
Figure 1C:
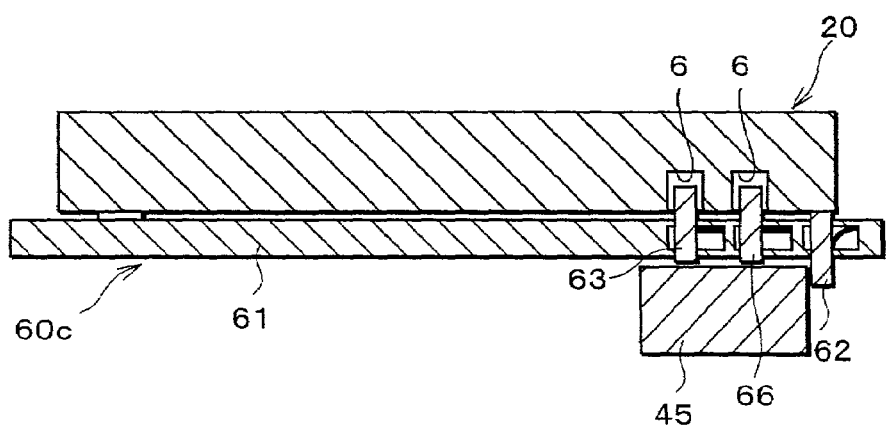
FIG. 1(c) is a sectional view illustrating the state of a disk cartridge for a larger diameter loaded.

In such a case, as shown in FIG. 1(a), FIG. 1(b) and FIG. 1(c), the disk cartridge 20 for a larger diameter is provided with two sensor holes 6, and the disk cartridge 25 for a medium diameter is provided with one sensor hole 6. Note that, the disk cartridge 30 for a smaller diameter is provided with no sensor hole 6. The position of each of two sensor holes 6 in the disk cartridge 20 for a larger diameter indicates each disk diameter of the disk cartridge 25 for medium diameter and the disk cartridge 30 for a smaller diameter or the outer most periphery during the movement of the pickup.

In the magneto-optical disk recording and reproducing apparatus 60c having the above arrangement, when any one of the disk cartridge 20 for a larger diameter, the disk cartridge 25 for medium diameter, and the disk cartridge 30 for a smaller diameter is not loaded, the stopper pin 62 for a larger diameter, the stopper pin 63 for a smaller diameter, and the stopper pin 25 for a medium diameter (a restricting member and a restricting pin), which are energized upward by the springs 64, 65, and 67, respectively, are projected out.

In the above state, for example, as shown in FIG. 1(a), when the disk cartridge 30 for a smaller diameter is loaded, only the stopper pin 63 for a smaller diameter is urged by the lower surface of the disk cartridge 30 for a smaller diameter and pushed downward from the mechanical chassis 61, thereby causing the stopper pin 63 for a smaller diameter to restrict the movement of the pickup housing 45 in the outer peripheral direction.

Meanwhile, for example, as shown in FIG. 1(b), when the disk cartridge 25 for medium diameter is loaded, only the stopper pin 66 for medium diameter is urged by the lower surface of the disk cartridge 25 for medium diameter and pushed downward from the mechanical chassis 61, thereby causing the stopper pin 66 for medium diameter to restrict the movement of the pickup housing 45 in the outer periphery direction.

Further, for example, as shown in FIG. 1(c), when the disk cartridge 20 for a larger diameter is loaded, only the stopper pin 62 for a larger diameter is urged by the lower surface of the disk cartridge 20 for a larger diameter and pushed downward from the mechanical chassis 61, thereby causing the stopper pin 62 for a larger diameter to restrict the movement of the pickup housing 45 in the outer periphery direction.

Thus, in the disk cartridge 10 and the magneto-optical disk recording and reproducing apparatuses 40, 60, 60a, 60b, and 60c of the present embodiment, the cartridge 22 of the disk cartridge 20 for a larger diameter is provided with the sensor holes 6 for recognizing the relation in size of disk diameter with the disk cartridge 30 for a smaller diameter containing the magneto-optical disk 31 for a smaller diameter. With this, the sensor hole 6 makes it possible to recognize the relation in size of disk diameter. As a result, this makes it possible to stop the pickup housing 45 moving to the outer periphery more than necessary by restricting the movement range of the pickup housing 45 according to disk diameters, thereby preventing the damage to the pickup housing 45 in advance.

Further, at least one sensor hole 6 is provided. That is, for example, it is possible to recognize by one of the sensor holes 6 which the disk cartridge 20 for a larger diameter is provided with if, for example, loaded are two types of disk cartridges: the disk cartridge 20 for a larger diameter and the disk cartridge 30 for a smaller diameter containing the magneto-optical disk 21 for a larger diameter and the magneto-optical disk 31 for a smaller diameter, respectively, having different disk diameters. Still further, it is possible to recognize, for example, by two the sensor holes 6 which the disk cartridge 20 for a larger diameter is provided with if loaded are three types of disk cartridges: the disk cartridge 20 for a larger diameter, the disk cartridge 25 for a medium diameter, and the disk cartridge 30 for a smaller diameter each of which contains the magneto-optical disks 1 having respective different disk diameters.

Thus, it is possible to provide the disk cartridge 10 which can realize recording and reproducing with high reliability in a single apparatus by recognizing differences in disk diameter with respect to the disk cartridge 20 for a larger diameter, the disk cartridge for medium diameter 25, and the disk cartridge 30 for a smaller diameter, each of which contains the magneto-optical disks 1 having different diameters.

Further, the disk cartridge 10 of the present embodiment is provided with the sensor hole 6 so as to indicate the disk diameter of the magneto-optical disk 1 or the outer most periphery during the movement of the pickup. This makes it possible to detect the outer most peripheral position during the movement of the pickup housing 45 of the disk cartridge 20 for a larger diameter, the disk cartridge 25 for a medium diameter, and the disk cartridge 30 for a smaller diameter.

As a result, this makes it possible to stop the pickup housing 45 moving to the outer periphery more than necessary and to reliably prevent the damage to the pickup housing 45 in advance.

Further, in the disk cartridge 10 of the present embodiment, the sensor holes 6 of the cartridge 22 of the disk cartridge 20 for a larger diameter and the cartridge of the disk cartridge 25 for medium diameter, are positioned at the same coordinate position or at the same radial position from the disk center of the magneto-optical disk recording and reproducing apparatuses 40, 60, 60a, 60b, and 60c. Such positions do not depend on the size of disk diameter of each magneto-optical disk 1.

This makes it possible to detect disk diameters of the disks contained in the disk cartridge 20 for a larger diameter, the disk cartridge 25 for a medium diameter, and the disk cartridge 30 for a smaller diameter by using the same stopper pins 52 and 62 for a larger diameter, the stopper pin 66 for a medium diameter, and the stopper pins 53 and 63 for a smaller diameter, regardless of differences in disk diameter and cartridge size. Further, even if a magneto-optical disk 1 having a larger diameter appears in the future, it is possible to apply the technique with regard to disk diameter detecting mechanism to a disk cartridge with the relation of the present embodiment, thereby restricting the pickup running out of control to the outer periphery which causes the damage to the apparatus.

Further, in the magneto-optical disk recording and reproducing apparatus 40, 60, 60a, 60b, and 60c of the present embodiment, it is possible to carry out the recording and reproducing with respect to the disk cartridge 10 in which the cartridge 2 is provided with the sensor hole 6.

Here, in the present embodiment, provided are the stopper pins 52, 62, and 62a for a larger diameter, the stopper pins 53 and 63 for a smaller diameter, or the stopper pin 66 for a medium diameter, which restrict the movement of the pickup housing 45 in the outer peripheral direction, which is not less than a predetermined of radius. Also, the stopper pins 52, 62, and 62a for a larger diameter, the stopper pins 53 and 63 for a smaller diameter, or the stopper pin 66 for medium diameter have functions to detect the disk diameter through the sensor hole 6 and to restrict the movement of the pickup housing 45 in the outer peripheral direction, which is not less than the predetermined of radius.

Thus, it is possible to detect the sensor hole 6 of the cartridge 2 by the stopper pins 52, 62, and 62a for a larger diameter, the stopper pins 53 and 63 for a smaller diameter, or the stopper pin 66 for medium diameter. Further, it is possible to stop the pickup housing 45 moving to the outer periphery more than necessary by restricting the movement range of the pickup housing 45 in accordance with the disk diameters, thereby preventing the damage to the pickup housing 45 in advance.

As a result, it is possible to provide the magneto-optical disk recording and reproducing apparatus 40, 60, 60a, 60b, and 60c which can realize recording and reproducing with high reliability by such a single apparatus by recognizing differences in disk diameter of the disk cartridge 20 for a larger diameter, the disk cartridge 25 for a medium diameter, and the disk cartridge 30 for a smaller diameter, each of which contains the magneto-optical disk 1 having a different diameter.

Further, in the magneto-optical disk recording and reproducing apparatus 40, 60, 60a, 60b, and 60c of the present embodiment, the stopper pins 52, 62, and 62a for a larger diameter, the stopper pins 53 and 63 for a smaller diameter, or the stopper pin 66 for medium diameter is made up of a plurality of restricting pins provided so as to project upward or downward (a) at the position corresponding to the sensor hole 6 on each cartridge 2 in the mechanical chassis 41 and 61, and (b) at the position which indicates the disk diameter of the magneto-optical disk 21 for a larger diameter having a larger disk diameter or which indicates the point of the outer most periphery during the movement of the pickup housing 45. This makes easy to arrange the restricting members.

Further, for example, the stopper pins 52 and 62 for a larger diameter and the stopper pins 53 and 63 for a smaller diameter are provided as follows. More specifically, when loaded is the disk cartridge 20 for a larger diameter or the disk cartridge 30 for a smaller diameter containing the magneto-optical disk 21 for a larger diameter or the magneto-optical disk 31 for a smaller diameter, respectively, having different disk diameters, the stopper pins 52 and 62 for a larger diameter contact with the cartridge lower surface of the disk cartridge 20 for a larger diameter and are pushed downward from the mechanical chassis 41 so as to restrict the position of the outer most periphery of the pickup housing 45. On the other hand, the stopper pins 53 and 63 for a smaller diameter, which are positioned at inner positions than the stopper pins 52 and 62 for a larger diameter that have been thus pushed downward, go into the sensor holes 6 of the cartridge 32 in the disk cartridge 30 for a smaller diameter so as to avoid the projection downward from the mechanical chassis 41.

As a result, it is possible to easily and reliably ensure the interchangeability of the apparatus with respect to two or more types of the magneto-optical disks 1 having different disk diameters when providing the stopper pin 62 for a larger diameter, the stopper pin 66 for medium diameter, the stopper pin 63 for a smaller diameter and sensor holes 6 in this manner.

Further, it is possible to prevent the damage to the pickup housing 45 at the time of the running out of control since the stopper pins 53 and 63, which restrict the position of the outer most periphery of the pickup housing 45, can be taken in and out, depending on the presence or absence of the sensor hole 6 of the disk cartridge 10.

Still further, in the magneto-optical disk recording and reproducing apparatus 60, 60a, and 60c of the present embodiment, the stopper pin 62 for a larger diameter, the stopper pin 63 for a smaller diameter, and the stopper pin 66 for medium diameter are caused to project upward from the mechanical chassis 61 by the springs 64 though 66.

As a result, the stopper pin 62 for a larger diameter, the stopper pin 63 for a smaller diameter, and the stopper pin 66 for a medium diameter can be easily projected upward from and pushed downward from the mechanical chassis 61. Also, the stopper pin 62 for a larger diameter, the stopper pin 63 for a smaller diameter, and the stopper pin 66 for a medium diameter can be easily projected upward from the mechanical chassis 61 when their contact with the lower surface of the cartridge is released.

Further, in the magneto-optical disk recording and reproducing apparatus 60b of the present embodiment, the stopper pin 62a for a larger diameter, which is provided at the position indicating the disk diameter of the magneto-optical disk 21 for a maximum diameter or the position of the outer most periphery during the movement of the pickup housing 45, is provided so as to be projected downward from the mechanical chassis 61 in a fixed manner.

With this, the restricting pin can be provided at the position indicating the disk diameter of the magneto-optical disk 21 for a maximum diameter having a maximum disk diameter or the position of the outer most periphery during the movement of the pickup housing 45. Thus, it is possible to ensure to mount the stopper pin 62a for a larger diameter and to stop the pickup housing 45 moving to the outer periphery more than necessary without fail for preventing the damage to the pickup housing 45 carrying the objective lens, an opposed lens actuator, or the magnetic head for recording in advance.

(Embodiment 2)

Figure 9A:
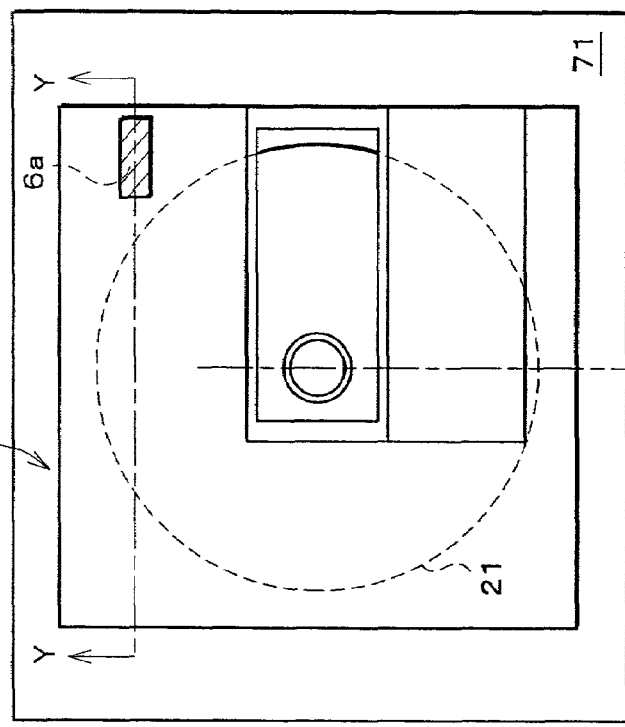
FIG. 9(a) is a view illustrating a disk cartridge and a magneto-optical disk recording and reproducing apparatus of another embodiment according to the present invention, and more specifically.
Figure 9B:
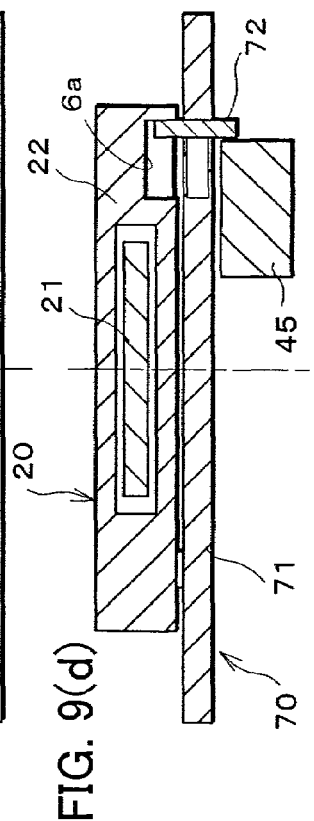
FIG. 9(b) is a sectional view of FIG. 9(a) taken along a line Y—Y.
Figure 9C:
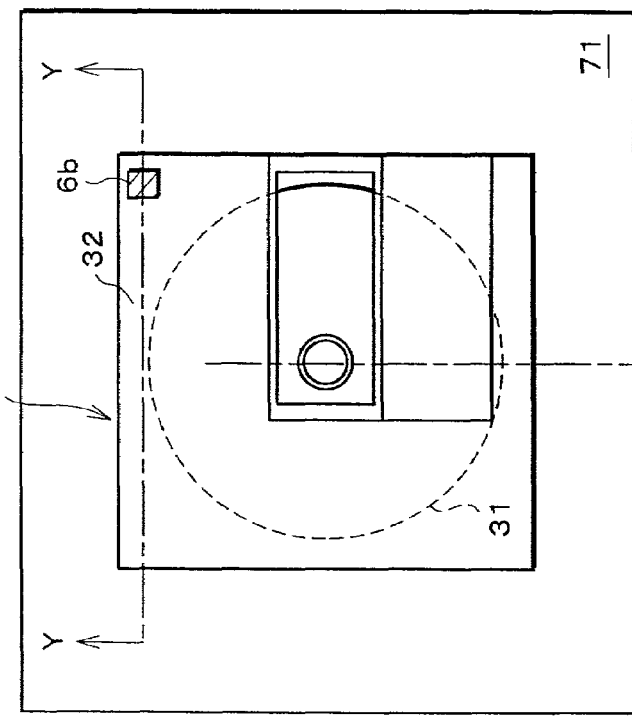
FIG. 9(c) is a plan view illustrating the state of the disk cartridge for a larger diameter loaded.
Figure 9D:
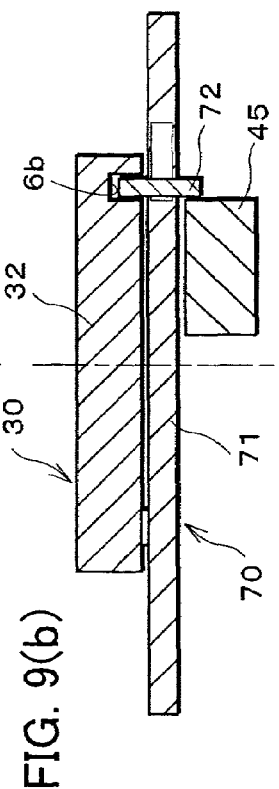
FIG. 9(d) is a sectional view of FIG. 9(c) taken along a line Y—Y.
Figure 10:
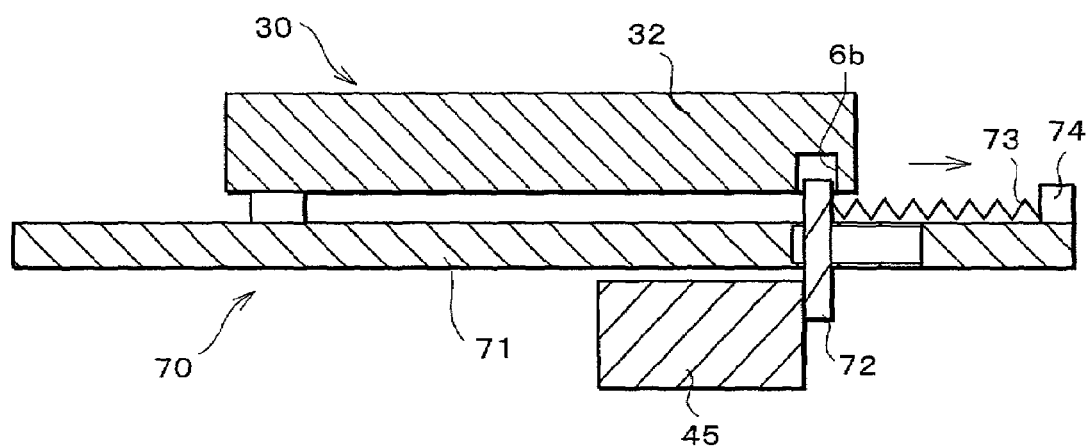
FIG. 10 is a sectional view illustrating the state after the disk cartridge for a smaller diameter is loaded.

Referring to FIG. 9 through FIG. 11, another embodiment according to the present invention is described below. Note that, for convenience, for the members that have the same functions as those shown in the figures of the above Embodiment 1, the same reference numerals are given and explanations thereof are omitted here. Also, note that, various features described in the Embodiment 1 are applicable to the present embodiment in combination of such features.

In the present embodiment, described is a disk cartridge and a disk recording and reproducing apparatus which have an arrangement so as to detect disk diameters by length of a sensor hole.

In the present embodiment, as shown in FIG. 9(c) and FIG. 9(d), the cartridge 22 of the disk cartridge 20 for a larger diameter is provided with a sensor hole 6a which is longer in the moving direction of the pickup housing 45. Meanwhile, as shown in FIG. 9(a) and FIG. 9(b), the cartridge 32 of the disk diameter 30 for a smaller diameter is provided with a sensor hole 6b, which is shorter, in the moving direction of the pickup housing 45, than the sensor hole 6a.

More specifically, the position and length of the sensor hole 6b corresponds to the radius of the outer most periphery of the pickup housing 45 with respect to the magneto-optical disk 31 for a smaller diameter of the disk cartridge 30 for a smaller diameter. On the other hand, the position and length of the sensor hole 6a corresponds to the radius of the outer most periphery of the pickup housing 45 with respect to the magneto-optical disk 21 for a larger diameter of the disk cartridge 20 for a larger diameter. Thus, it is taken for granted that the length of the sensor hole 6b is shorter than that of the sensor hole 6a in accordance with the magneto-optical disk 31 for a smaller diameter.

The sensor holes 6a and 6b are positioned in such a manner that a stopper pin 72 (a common restricting member and a restricting pin) provided on a mechanical chassis 71 (a chassis) goes into the sensor holes 6a and 6b. Further, the lengths of the sensor holes 6a and 6b are set so as to be in proportion to distances such as the moving range of the stopper pin 72 and disk diameter.

An arrangement in the present embodiment is such that the initial position of the stopper pin 72 before loading the disk cartridge 20 for a larger diameter and the disk cartridge 30 for a smaller diameter corresponds to the position of the outer most periphery of the magneto-optical disk for a smaller diameter 31, and its length corresponds to the difference (distance) between the positions of the outer most peripheries of the magneto-optical disk 21 for a larger diameter and the magneto-optical disk 31 for a smaller diameter.

In the disk cartridge and the disk recording and reproducing apparatus 70 of the above arrangement, more specifically, as shown in FIG. 10, FIG. 11(a), and FIG. 11(b), for example, the stopper pin 72 is previously caused by an elastic member 73 to be pressed from the inner toward the outer. That is, the end part of the mechanical chassis 71 of the magneto-optical disk recording and reproducing apparatus 70 is provided with an elastic member fixing section 74. The elastic member 73 such as spring and rubber is provided between the elastic member fixing section 74 and the stopper pin 72 so as to shrink toward the elastic member fixing section 74.

Further, the position of the stopper pin 72 before loading the disk cartridge 20 for a larger diameter or the disk cartridge 30 for a smaller diameter corresponds to the position of the outer most periphery of the disk cartridge 30 for a smaller diameter. When loading the disk cartridge 30 for a smaller diameter, the movement of the pickup housing 45 is restricted at the initial setting position because of no movement amount of the stopper pin 72 in the sensor hole 6b.

On the other hand, when loading the disk cartridge 20 for a larger diameter as shown in FIG. 11(a) and FIG. 11(b), in the sensor hole 6a, the stopper pin 72 is moved by the elastic member 73 by the length of the sensor hole 6a in the direction of the outer periphery of the pickup housing 45 and stops at the side of the outer periphery of the sensor hole 6a.

As a result, even if the pickup housing 45 crashes with respect to the stopper pin 72, the cartridge 22 accepts the crash. Thereby, fears of the damage to the optical pickup (not shown) or a magnetic head 46 decrease.

Note that, in the above example, the elastic member 73 is positioned on the outer periphery side of the mechanical chassis 71 in the initial condition. As shown in FIG. 10, therefore, when removing the cartridge which has been loaded, the stopper pin 72 is moved back against the elastic member 73 to the center side of the mechanical chassis 71 by a part of mechanism of a loading mechanism (not shown) thereafter is disposed at the position directly below the sensor hole 6b.

In case of the present embodiment in comparison with that of the Embodiment 1, there are advantages such that a single positioning pin is needed from the view point of the mechanism, and it is possible to easily cope with two or more types of disk cartridges. That is, it is also possible to easily cope with three or more types of disk cartridges having different diameters.

Thus, the disk cartridge 20 for a larger diameter and the disk cartridge 30 for a smaller diameter according to the present embodiment are provided with a single sensor hole 6a elongated radially so as to indicate disk diameters of the magneto-optical disk 31 for a smaller diameter having a minimum disk diameter and the magneto-optical disk 21 for a larger diameter having a maximum disk diameter, or the position of the outer most periphery during the movement of the pickup housing 45.

That is, instead of a plurality of sensor holes in the radial direction indicating disk diameter or the position of the outer most periphery during the movement of the pickup housing 45, a single sensor hole 6a elongated radially can be used. In other words, like the present embodiment, with respect to each of the cartridges 22 and 32 of the magneto-optical disk 21 for a larger diameter and the magneto-optical disk for a smaller diameter 31, respectively, a single sensor hole 6a, which is elongated radially, is provided so as to indicate a disk diameter from the magneto-optical disk 31 for a minimum diameter having a smaller diameter to the magneto-optical disk 21 for a larger diameter having the larger disk diameter, or the position of the outer most periphery during the movement of the pickup housing 45. In this manner, the stopper pin 72, which is fitted to the sensor hole 6a with spacing, provided on the side of the magneto-optical disk recording and reproducing apparatus 70 can detect the position of the outer most periphery during the movement of the pickup housing 45 in accordance with each of the disk cartridge 20 for a larger diameter and the disk cartridge 30 for a smaller diameter, thereby restricting the pickup housing 45 to run out of control and to move to the outer periphery so as to cause the damage to the apparatus.

In the case, note that, the disk cartridge 30 for a smaller diameter having a minimum disk diameter is provided with a small sensor hole 6b, and the disk cartridge 20 for a larger diameter having a maximum disk diameter is provided with a sensor hole 6a longer than the sensor hole 6b. Further, the outer most periphery end part of each sensor holes 6a and 6b is the outer most peripheral position during the movement of the pickup with respect to each of the disk cartridge 20 for a larger diameter and the disk cartridge 30 for a smaller diameter.

Further, it is possible to prevent the damage to the pickup housing 45 when the pickup housing 45 runs out of control since the lengths of the sensor holes 6a and 6b move with the outer most peripheral position during the movement of the pickup housing 45. In addition, it is possible to relatively easily secure an interchangeability between apparatuses with respect to two or more types of the magneto-optical disks 1 having respective different disk diameters.

Still further, the magneto-optical disk recording and reproducing apparatus 70 of the present embodiment is arranged so as to detect lengths of the sensor holes 6a and 6b and to mechanically define a movable outer peripheral position of the pickup housing 45. With this, the lengths of the sensor holes 6a and 6b move with the outer most peripheral position during the movement of the pickup housing 45. It is, therefore, possible to prevent the damage to the pickup housing 45 when the pickup housing 45 runs out of control, and it is also possible to relatively easily secure the interchangeability between the apparatuses with respect to two or more types of magneto-optical disks: the magneto-optical disk 21 for a larger diameter and the magneto-optical disk for a smaller diameter 31 having respective different disk diameters.

Further, in the magneto-optical disk recording and reproducing apparatus 70 of the present embodiment, the mechanical chassis 71 has one stopper pin 72 which is inserted to the sensor holes 6a and 6b of the respective cartridges 22 and 32 in loading and which is radially movable so as to contact with the pickup housing 45.

With this, the lengths of the sensor holes 6a and 6b move with the outer most peripheral position during the movement of the pickup housing 45. It is, therefore, possible to prevent the damage to the pickup housing 45 when the pickup housing 45 runs out of control, and it is also possible to relatively easily secure the interchangeability between the apparatuses with respect to two or more types of magneto-optical disks 1 having respective different disk diameters.

(Embodiment 3)

Referring to FIG. 12 through FIG. 17, a further embodiment according to the present invention is described below. Note that, for convenience, for the members that have the same functions as those shown in the figures of the above Embodiment 1 and Embodiment 2, the same reference numerals are given and explanations thereof are omitted here. Also, note that, various features described in Embodiment 1 and Embodiment 2 are applicable to the present embodiment in combination of such features.

In the present embodiment, described is a method for cope with the pickup housing running out of control without providing a sensor hole on the disk cartridge side.

Figure 12:
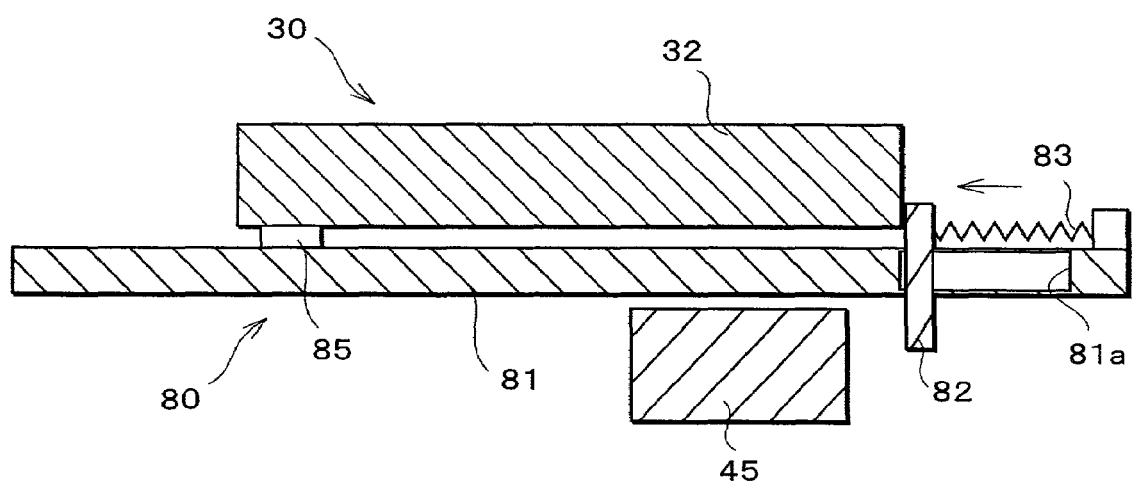
FIG. 12 is a view illustrating a disk cartridge and a magneto-optical disk recording and reproducing apparatus of yet another embodiment according to the present invention, and a sectional view illustrating the state after the disk cartridge for a smaller diameter is loaded.
Figure 13:
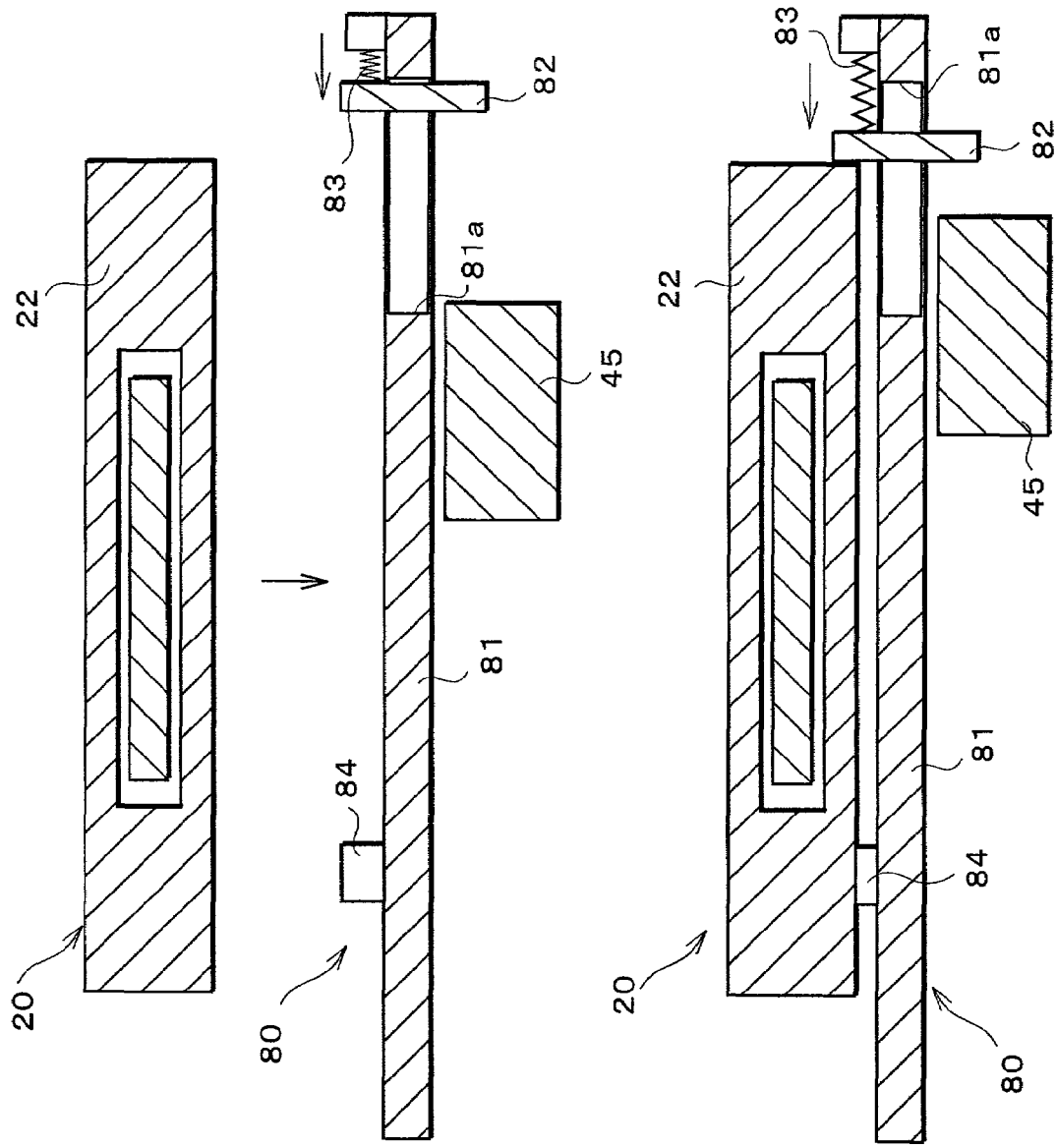
FIG. 13(a) is a sectional view illustrating the state before the disk cartridge for a larger diameter is loaded.
FIG. 13(b) is a sectional view illustrating the state after the disk cartridge for a larger diameter is loaded.

In a disk cartridge 30 for a smaller diameter, a disk cartridge 20 for a larger diameter, and a magneto-optical disk recording and reproducing apparatus 80, as shown in FIG. 12, FIG. 13(a), and FIG. 13(b), a stopper pin 82 (a restricting member) provided in an opening 81a of a mechanical chassis 81 (a chassis) is previously energized by an elastic member 83 from the outer toward the inner. The cartridge 22 and the cartridge 32 are loaded in a state where they are pressed by the stopper pin 82.

That is, as shown in FIG. 13(b), When the disk cartridge 30 for a smaller diameter and the disk cartridge 20 for a larger diameter are not loaded, the position of the stopper pin is fixed on the outer peripheral side by a lock mechanism (not shown). In such a state, as shown in FIG. 12 and FIG. 13(b), when the disk cartridge 30 for a smaller diameter and the disk cartridge 20 for a larger diameter are loaded, the lock mechanism is released, and the stopper pin 82 moves from the outer of the disk cartridge 30 for a smaller diameter or the disk cartridge 20 for a larger diameter toward the sides of the cartridges 32 and 22. Then, the stopper pin 82 contacts with the cartridges 32 and 22 to stop.

In the case of the disk cartridge 20 for a larger diameter, it is taken for granted that the stopping position of the stopper pin 82 is more outer than that of the disk cartridge 30 for a smaller diameter. An agreement between the stopping position of the cartridges and that of the pickup housing 45 makes it possible to prevent the cartridges 32 and 22 from crashing with the optical pickup (not shown) or the magnetic head 46.

It should be noted that, when the force by which the pickup housing 45 is moved in an outer peripheral direction is greater than that of the elastic member 83, the stopper pin 82 moves toward the outer periphery. Therefore, it cannot be said that there is definitely no danger of the damage to the optical pickup and the magnetic head 46. Thus, as an ideal method, more preferable is a method in which the sides of the cartridges 22 and 32 or the sensor holes 6, 6a, and 6b described in Embodiment 1 and Embodiment 2 stops the members such as the stopper pin 72 moving further to the outer periphery. The method is not especially difficult because the moving amount of the stopper pin 82 can be detected even if needed to detect a disk diameter when the disk cartridge 30 for a smaller diameter or the disk cartridge 20 for a larger diameter is inserted in an electrically powered manner.

The following is advantages of movement restriction of the pickup housing 45 with use of the sides of the cartridges 22 and 32. That is, the cartridges 22 and 32 are mounted to the mechanical chassis 81 through cartridge positioning pins 84 and 85. Therefore, as described in the Embodiment 2, even when the stopper pin 72 moves, the sides of the cartridges 22 and 23 do not crash with the pickup housing 45. Accordingly, it is possible to secure a relatively good positioning accuracy.

Thus, the disk cartridge 20 for a larger diameter, the disk cartridge 30 for a smaller diameter, and the magneto-optical disk recording and reproducing apparatus 80 have an arrangement such that the mechanical chassis 81 is provided with the stopper pin 82 which presses the side walls of the cartridges 22 and 32 to contact with the pickup housing 45 when the disk cartridge 20 for a larger diameter or the disk cartridge 30 for a smaller diameter is loaded and which restricts the movement of the pickup housing 45 in the outer peripheral direction, which is not less than a predetermined of radius.

With this, without the sensor holes 6 made in the disk cartridge 20 for a larger diameter, it is possible that the stopper pin 82 contacts with the pickup housing 45 and restricts the movement of the pickup housing 45 in the outer peripheral direction, which is not less than a predetermined of radius. Thereby, it is possible to prevent the damage to the pickup housing 45 when its running out of control.

As a result, it is possible to provide the magneto-optical disk recording and reproducing apparatus 80 which can realize the recording and reproducing with high reliability by such a single apparatus by recognizing differences in disk diameter with respect to each of the disk cartridge 20 for a larger diameter and the disk cartridge 30 for a smaller diameter, which contains the magneto-optical disk 21 for a larger diameter and the magneto-optical disk for a smaller diameter 31, respectively, having different diameters.

Note that, in the magneto-optical disk recording and reproducing apparatus 80, the stopper pin 82 (restricting means) restricts the movement of the pickup housing 45 in the outer peripheral direction; however, the magneto-optical recording and reproducing apparatus 80 can be arranged so as to simply detect a size of the disk cartridge 10, not having a restricting function.

Figure 14:
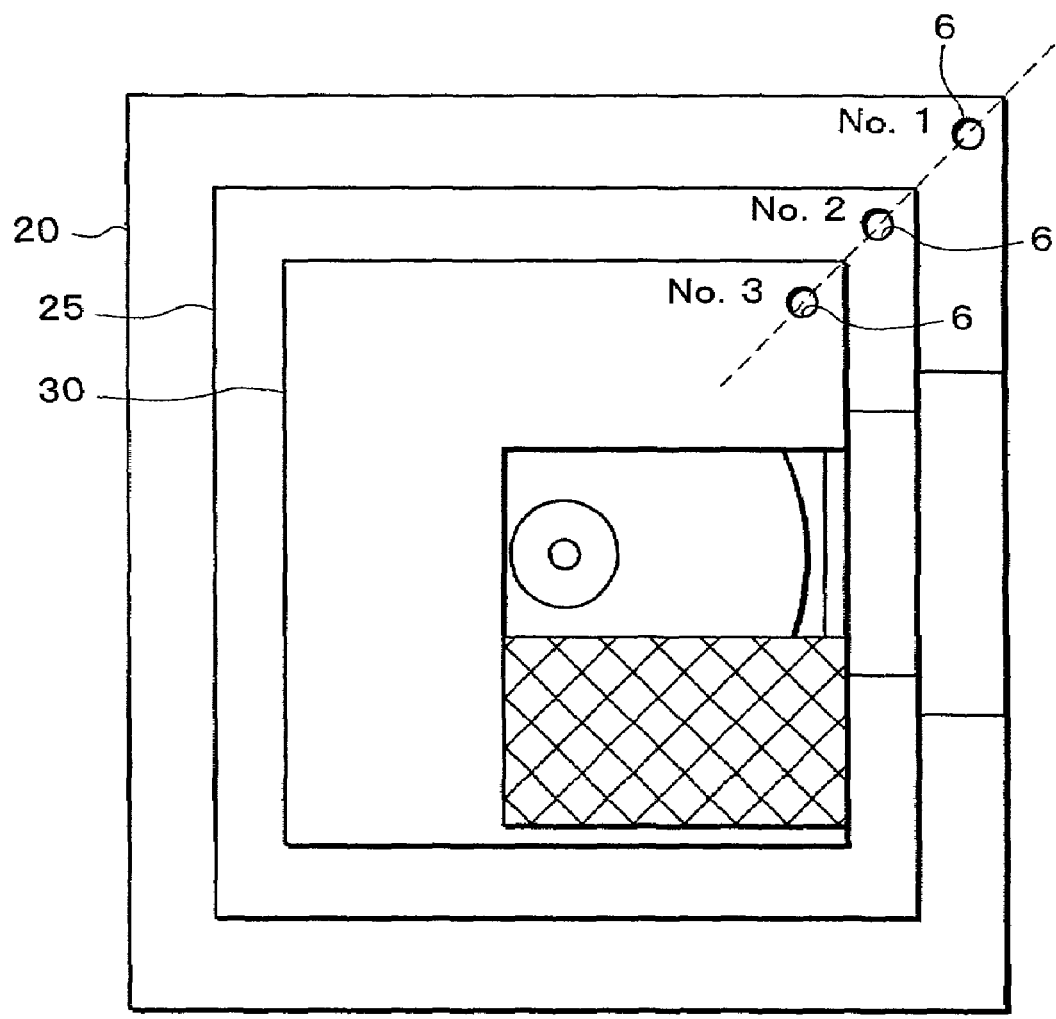
FIG. 14 is a view illustrating a disk cartridge of a further embodiment according to the present invention, and more specifically, a plan view illustrating a relation in position of sensor holes provided on each of the disk cartridge for a larger diameter, the disk cartridge for medium diameter, and the disk cartridge for a smaller diameter.
Figure 15A:
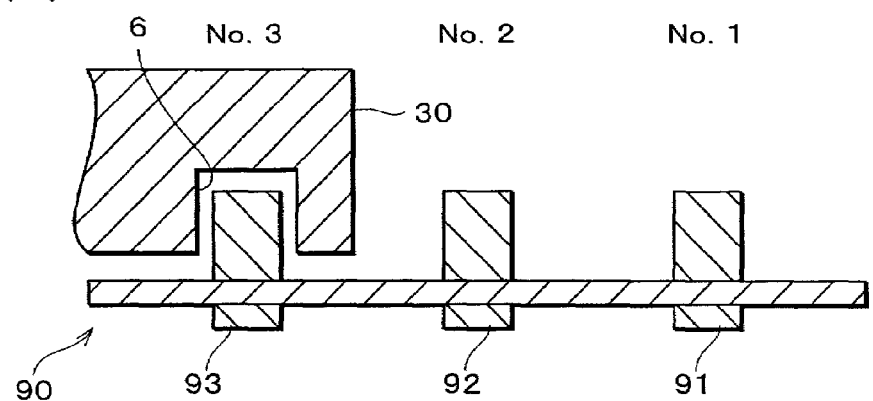
FIG. 15(a) is a sectional view illustrating detecting operation of each disk cartridge of the magneto-optical disk recording and reproducing apparatus to record and reproduce with respect to the disk cartridge for a smaller diameter.
Figure 15B:
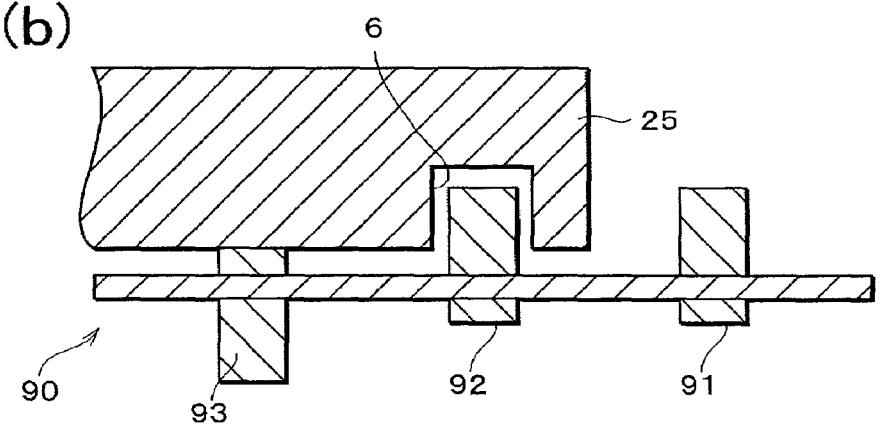
FIG. 15(b) is a sectional view illustrating detecting operation of each disk cartridge of the magneto-optical disk recording and reproducing apparatus to record and reproduce with respect to the disk cartridge for medium diameter.
Figure 15C:
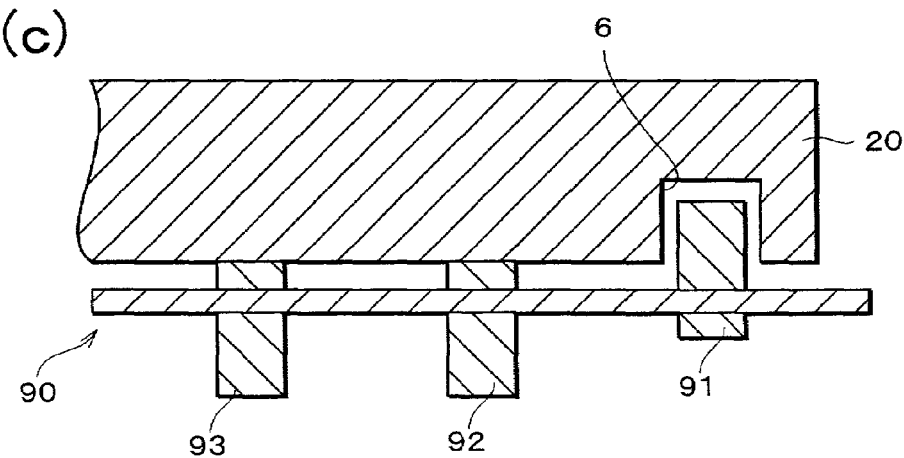
FIG. 15(c) is a sectional view illustrating detecting operation of each disk cartridge of the magneto-optical disk recording and reproducing apparatus to record and reproduce with respect to the disk cartridge for a larger diameter.
Figure 18:
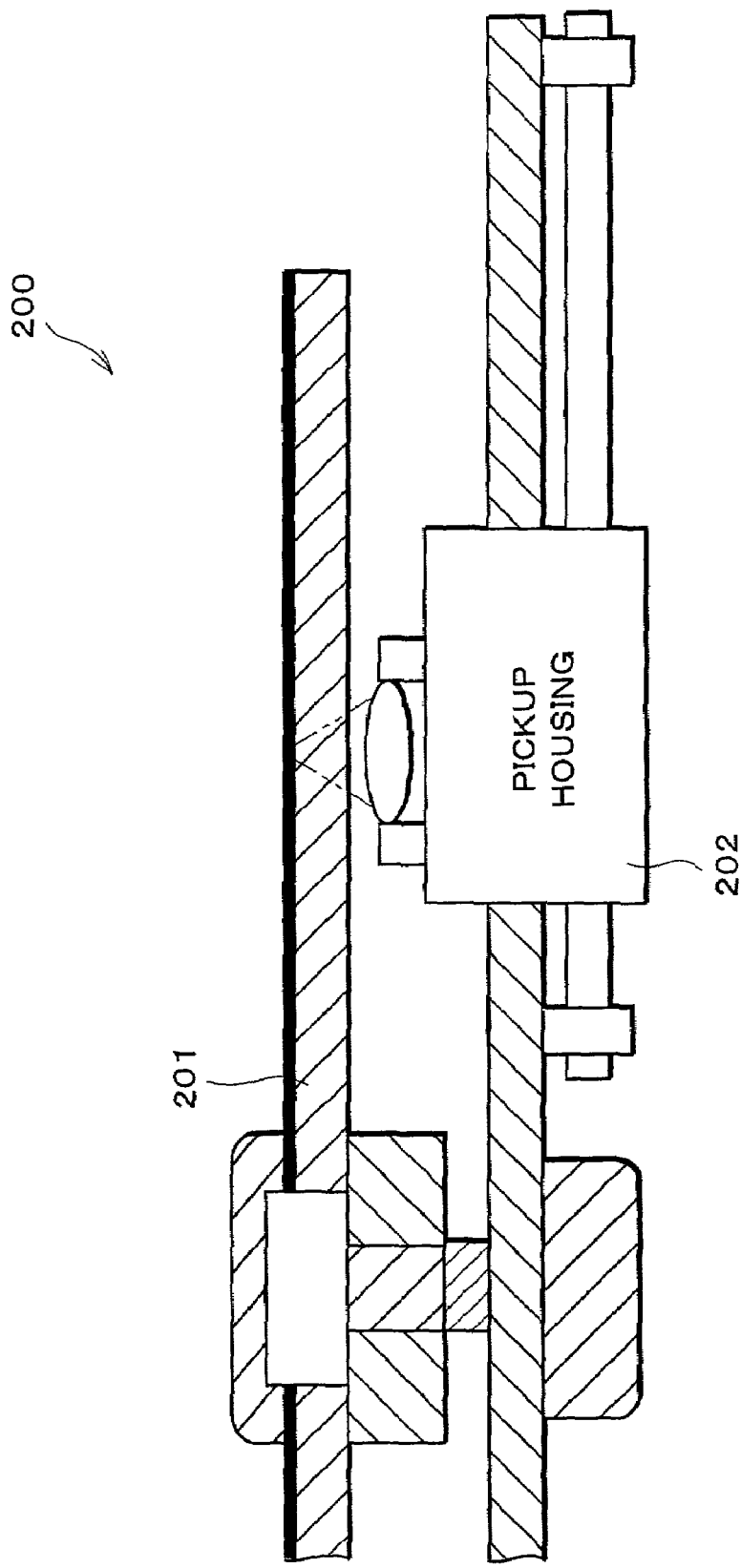
FIG. 18 is a sectional view illustrating an arrangement of a conventional common CD apparatus.
Figure 19:
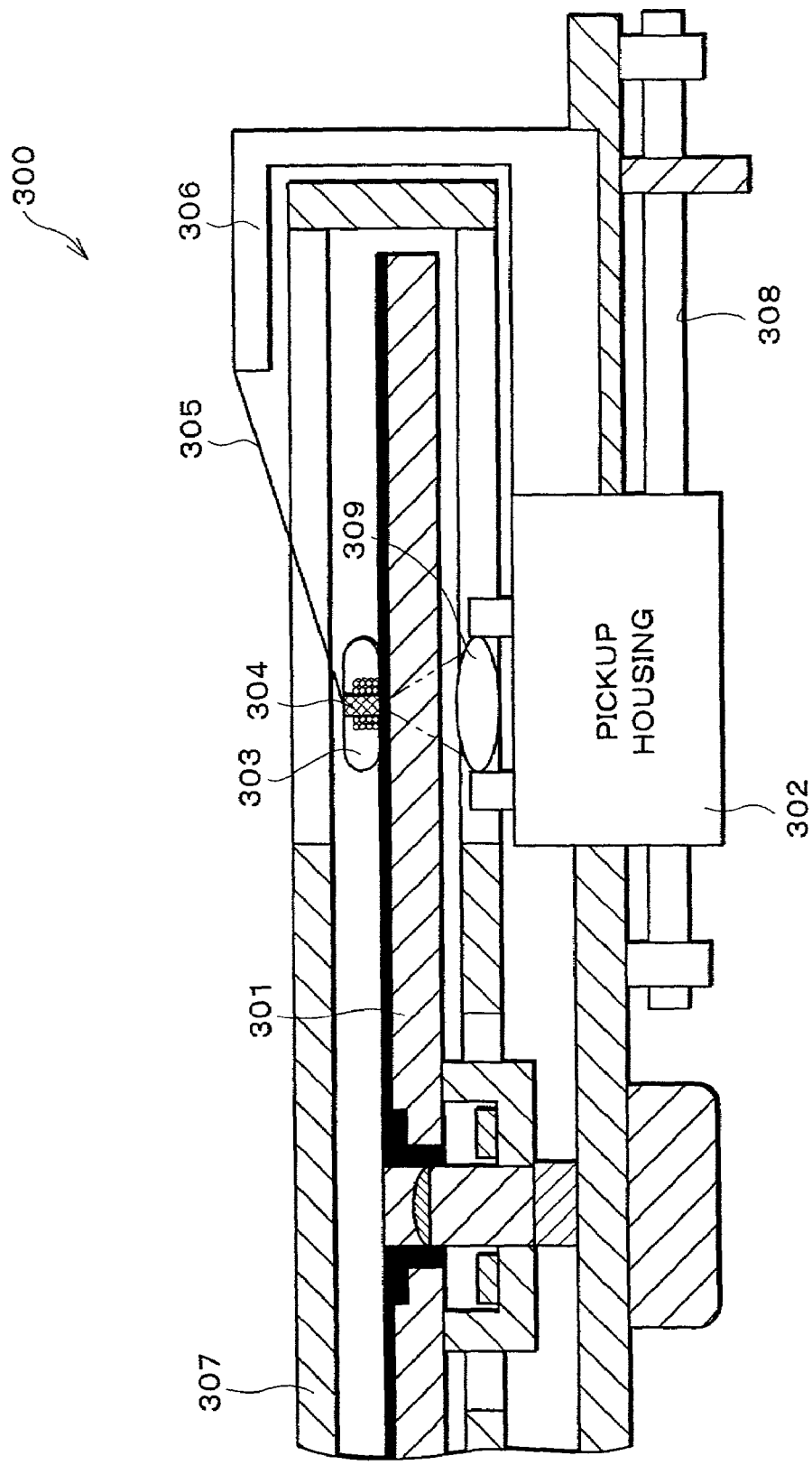
FIG. 19 is a sectional view illustrating an arrangement of a conventional MD apparatus.
Figure 20:
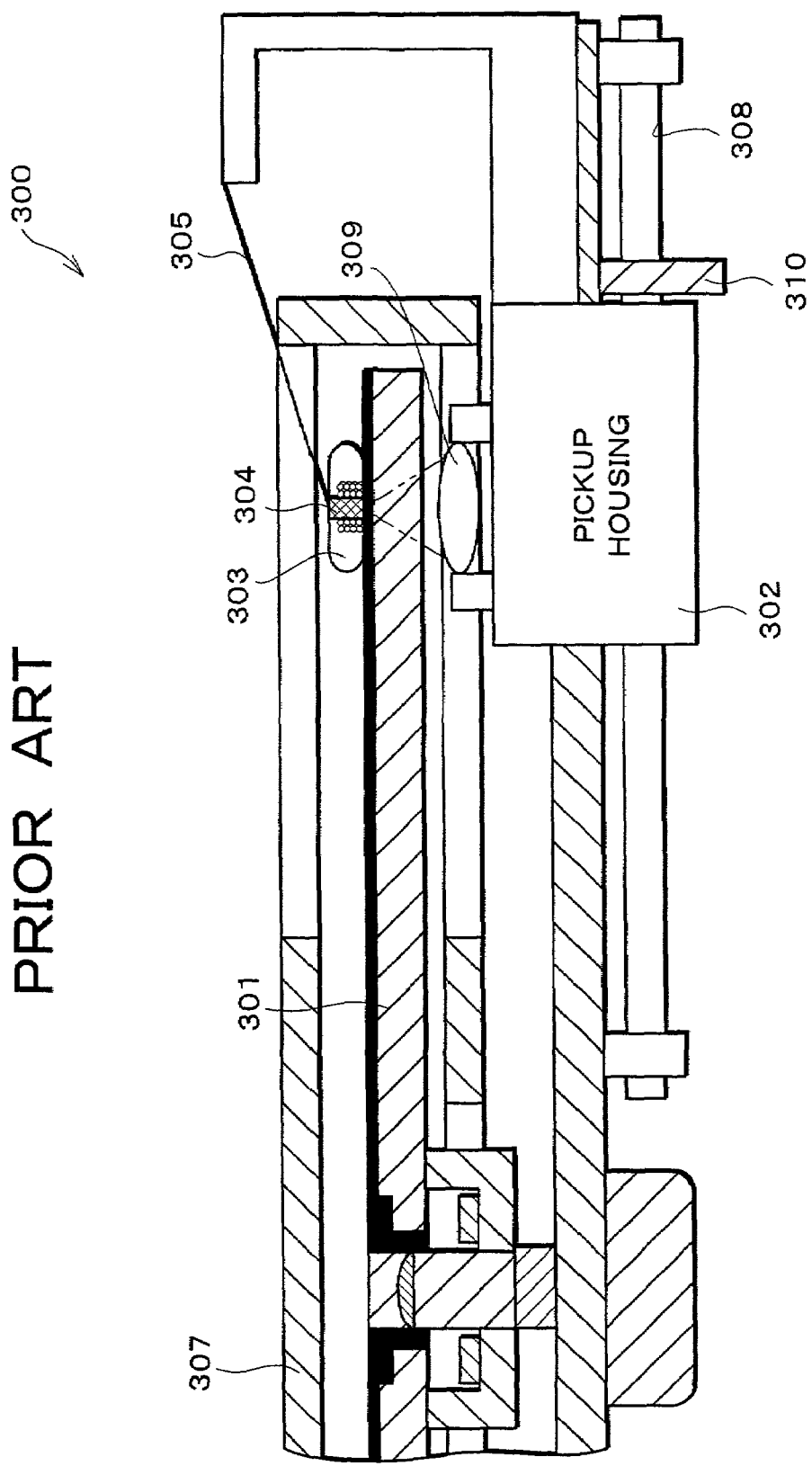
FIG. 20 is a sectional view illustrating the MD apparatus in the state that a pickup housing is restricted to move in the outer direction by a housing stopper.

For example, as shown in FIG. 14, each of the disk cartridge 20 for a larger diameter, the disk cartridge 25 for a medium diameter, and the disk cartridge 30 for a smaller diameter is provided with the sensor hole 6. As shown in FIG. 15(a), FIG. 15(b), and FIG. 15(c), in a magneto-optical disk recording and reproducing apparatus 90 to carry out the recording and reproducing with respect to each of disk cartridges 20, 25, and 30, a sensor pin 91 for a larger diameter, a sensor pin 92 for a medium diameter, and a sensor pin 93 for a smaller diameter are provided as a mechanism for detecting sizes in accordance with sizes of the respective disk cartridges 20, 25, and 30, namely, the positions of the respective sensor holes 6.

This makes the magneto-optical disk recording and reproducing apparatus 90 different from the magneto-optical disk recording and reproducing apparatus 60c of the Embodiment 1. Since each of disk cartridges 20, 25, and 30 is provided with a single sensor hole 6, the sensor pin 91 for a larger diameter, the sensor pin 92 for a medium diameter, and the sensor pin 93 for a smaller diameter can move up and down in accordance with each of the disk cartridges 20, 25, and 30, as shown in FIG. 15(a) through FIG. 15(c). As a result, patterns of such up-and-down movements are different among the sensor pin 91 for a larger diameter, the sensor pin 92 for a medium diameter, and the sensor pin 93 for a smaller diameter. This makes it possible to detect the size of each of the respective disk cartridges 20, 25, and 30. Note that, in such a case, it does not mean the restriction of the movement toward the outer periphery even if each of the sensor pin 91 for a larger diameter, the sensor pin 92 for a medium diameter, and the sensor pin 93 for a smaller diameter projects downward.

Further, as another determining means, for example, as shown in FIG. 16(a) and FIG. 16(b), an opening lid 102 provided in a cartridge holder 101 can be used when the disk cartridge 30 for a smaller diameter or the disk cartridge 20 for a larger diameter is inserted.

The opening lid 102 is arranged to cover a side end part 103*a* of an opening 103 for inserting for the disk cartridge 30 for a smaller diameter or the disk cartridge 20 for a larger diameter. That is, as shown in FIG. 16(*a*), the opening lid 102 has a length so as to cover the side end part 103*a* of the opening 103 for inserting when the disk cartridge 30 for a smaller diameter is inserted to a cartridge holder 101. Further, the opening lid 102 is hinged to be rotatable in the direction shown by the arrow as shown in FIG. 16(*b*) and is disposed by a spring (not shown) so as to cover the side end part 103*a* of the opening for inserting 103 (see FIG. 16(*a*)). Still further, in the rotation range of the opening lid 102, a detection switch 104 is provided to move back and forth in a direction orthogonal to the side surface of the cartridge holder 101.

Therefore, in the magneto-optical disk recording and reproducing apparatus 100 having such an arrangement, for example, when the disk cartridge 20 for a larger diameter is inserted, the inserting end of the disk cartridge 20 for a larger diameter presses the opening lid 102 to rotate the opening lid 102 in the direction shown by the arrow as shown in FIG. 16.(*b*). Thereby, the detecting switch 104 moves back, and it is possible to detect that the disk cartridge 20 for a larger diameter has inserted. That is, it is possible to determine whether the disk cartridge 20 for a larger diameter or the disk cartridge 30 for a smaller diameter has been inserted, depending on whether the detecting switch 104 is pushed or not.

Note that, since the detecting switch 104 keeps the state of moving forth when the disk cartridge 30 for a smaller diameter has been inserted, it is possible to avoid the pickup housing 45 from running out of control by previously setting a restricting member or restricting means for the disk cartridge 30 for a smaller diameter.

Further, in a magneto-optical disk recording and reproducing apparatus 100 as shown in FIG. 16(*a*) and FIG. 16(*b*), the disk center of the disk cartridge 20 for a larger diameter deviates from that of the disk cartridge 30 for a smaller diameter in loading. Thus, it is impossible to reproduce in such a state. In order to lose the deviation of the disk center, for example, it is possible to arrange in such manner that the cartridge holder 101 moves to shift the disk center on the spindle motor 42 after the cartridge holder 101 holds the cartridge.

Note that, in the above example, the disk cartridge 30 for a smaller diameter or the disk cartridge 20 for a larger diameter is inserted such that the shutter 5 side of each of disk cartridges 30 and 20 becomes a top end; however, the present invention is not necessarily limited to this. For example, as shown in FIG. 17(*a*) and FIG. 17(*b*), it can be inserted with the shutter 5 of each of disk cartridges 30 and 20 laid. Also, as a further determining method without using the detecting switch 104, a method of detecting rotation angle of the opening lid 102 can be adopted. Still further, a method of determining disk sizes from users' inputs and restricting the movement amount of the pickup housing 45 can be adapted.

Also, in the magneto-optical disk recording and reproducing apparatuses 90 and 100, the stopper pin 82 adopted for the magneto-optical disk recording and reproducing apparatuses 80 is used as restricting means; however, the present invention is not limited to this, and other restricting means can be adopted.

With the use of these methods, it is possible to recognize the disk size when inserting cartridges and to restrict the movement range of the pickup housing 45 by the end of disk loading.

Thus, the magneto-optical disk recording and reproducing apparatuses 90 and 100 of the present embodiment is provided with restricting means such as the stopper pin 82 to restrict the movement amount of the pickup housing 45 in accordance with the size of the loaded disk cartridges: the disk cartridge 20 for a larger diameter, the disk cartridge 25 for a medium diameter, and the disk cartridge 30 for a smaller diameter.

With this, it is possible that restricting means contacts with the pickup housing 45 and restricts the movement of the pickup housing 45 in the outer peripheral direction, which is not less than a predetermined of radius. Thereby, it is possible to prevent the damage to the pickup housing 45 when its running out of control.

As a result, it is possible to provide the disk recording and reproducing apparatuses 90 and 100 which can realize the recording and reproducing with high reliability by such a single apparatus by recognizing differences in disk diameter with respect to each cartridge containing the disk cartridge 20 for a larger diameter, the disk cartridge 25 for medium diameter, and the disk cartridge 30 for a smaller diameter.

Also, the disk recording and reproducing apparatuses 90 and 100 are provided with determining means which determines the size of the loaded disk cartridges: the disk cartridge 20 for a larger diameter, the disk cartridge for a medium diameter 25, and the disk cartridge 30 for a smaller diameter. The determining means has (a) the stopper pin for a larger diameter 91, the stopper pin for medium diameter 92, and the stopper pin for a smaller diameter 93, or has (b) the opening lid 102 and the detecting switch 104.

With this, (a) the stopper pin 91 for a larger diameter, the stopper pin 92 for a medium diameter, and the stopper pin 93 for a smaller diameter, or (b) the opening lid 102 and the detecting switch 104 determines each size of the disk cartridge 20 for a larger diameter, the disk cartridge 25 for a medium diameter, and the disk cartridge 30 for a smaller diameter.

Therefore, it is possible to reliably determine the size of the disk cartridge 20 for a larger diameter, the disk cartridge 25 for a medium diameter, and the disk cartridge 30 for a smaller diameter.

In a disk cartridge of the present invention as described in Embodiment 1 through Embodiment 3, each of the above disk cartridges is provided with a sensor hole so as to indicate disk diameter of each disk recording medium or the outer most peripheral position during the movement of the pickup.

Therefore, this makes it possible to detect the outer most peripheral position during the movement of the pickup in each disk cartridge.

As a result, this makes it possible to stop the pickup moving to the outer periphery more than necessary and to reliably prevent the damage to the pickup in advance.

Further, another disk cartridge of the present invention, in the structure of the above disk cartridge, the sensor hole of each cartridge is at the same coordinate position or at the same radial position with respect to the disk center of the disk recording and reproducing apparatus regardless of the diameter of each disk recording medium.

Therefore, such positions do not vary depending on the disk diameter of each disk recording medium. Note that, here is on the condition that the recording and reproducing are carried out by a single spindle and a single pickup. Therefore, since the same spindle chucks even in case of the cartridge having a different cartridge (disk) size, the diameter of the disk contained in the disk cartridge can be detected by a single sensor (the same position, the same detecting mechanism).

This makes it possible to detect disk diameters of the disks contained in the disk cartridges by using the same sensor regardless of differences in disk diameter and cartridge size. Further, even if a disk having larger diameter appears in the future, it is possible to apply the technique with regard to disk diameter detecting mechanism to a disk cartridge with the relation of the present embodiment, thereby easily restricting the pickup running out of control to the outer periphery which causes the damage to the apparatus.

Further, a further disk cartridge of the present invention, in addition to the disk cartridge as described above, is provided with the hole made up of a single hole radially elongated so as to indicate the disk diameters from the disk recording medium having a minimum diameter to the first disk recording medium of the first cartridge, or the outer most peripheral position during the movement of the pickup.

That is, instead of a plurality of holes in the radial direction each indicating disk diameter or the outer most peripheral position during the movement of the pickup, the sensor made up of a single hole radially elongated can be used. In other words, like the present invention, with respect to each cartridge of the disk recording medium, a single hole, which is elongated radially, is provided so as to indicate a disk diameters from the disk recording medium having a minimum disk diameter to the first disk recording medium of the first cartridge, or the position of the outer most periphery during the movement of the pickup. In this manner, the restricting member, which is fitted to the hole with spacing, provided on the side of the disk recording and reproducing apparatus can detect the position of the outer most periphery during the movement of the pickup in accordance with each disk cartridge, thereby restricting the pickup to run out of control and to move to the outer periphery so as to cause the damage to the apparatus.

In the case, note that, the disk cartridge having a minimum disk diameter is provided with a small hole, and the first disk cartridge is provided with a hole longer than the small hole. Further, the outer most peripheral end parts of each long hole are the outer most peripheral positions during the movement of the pickup with respect to each disk cartridge.

Further, it is possible to prevent the damage to the pickup when the pickup runs out of control since the lengths of the holes move with the outer most peripheral position during the movement of the pickup. In addition, it is possible to relatively easily secure an interchangeability between apparatuses with respect to two or more types of the disk recording media having respective different disk diameters.

Further, still a further disk recording and reproducing apparatus of the present invention has a chassis which is provided with restricting member, which is made up of a plurality of restricting pins that project upward or downward, (a) at the position associated with the hole on each of cartridges, and (b) at the position which indicates the disk diameter of the disk recording medium having a maximum disk diameter or the outer most peripheral position during the movement of the pickup. Further, when loaded is the disk cartridge containing the disk recording medium having a different disk diameter, each restricting pin of the chassis contacts with the cartridge lower surface of the disk cartridge and is pushed downward from the chassis so as to restrict the outer most peripheral position of the pickup. On the other hand, the restricting pins which are provided inside of the above restricting pins pushed downward go into the hole of each cartridge to avoid the projection downward from the chassis.

Therefore, the arrangement is simple because the restricting member is made up of pin.

Further, when loaded is the disk cartridge containing the disk recording medium having a different disk diameter, each restricting pin of the chassis contact with the cartridge lower surface of the disk cartridge and is pushed downward from the chassis so as to restrict the outer most peripheral position of the pickup. On the other hand, the restricting pins which are provided inside of the above restricting pins pushed downward go into the hole of each cartridge to avoid the projection downward from the chassis.

As a result of this, it is possible to easily and reliably ensure the interchangeability between the apparatuses with respect to two or more types of the disk recording medium having different disk diameter when providing the restricting pin and the hole in this manner.

Further, it is possible to prevent the damage to the pickup at the time of the running out of control since the restricting pins, which restrict the position of the outer most periphery of the pickup, can be taken in and out, depending on the presence or absence of the hole of the disk cartridge.

Still further, in the disk recording and reproducing apparatus of the present invention, with respect to the disk recording and reproducing apparatus as described above, each restricting pin is caused to project upward from the chassis by the elastic material.

Therefore, the restricting pin can be easily projected upward from and pushed downward from the chassis. Also, each restricting pin pushed downward from the chassis can be easily projected upward from the chassis when its contact with the lower surface of the cartridge is released.

Further, in the disk recording and reproducing apparatus of the present invention, with respect to the disk recording and reproducing apparatus as described above, the restricting pin, which is provided at the position indicating the disk diameter of the disk recording medium having a maximum disk diameter or the position of the outer most periphery during the movement of the pickup, is provided so as to be projected downward from the chassis in a fixed manner.

With this, the restricting pin can be provided as a fixed restricting pin at the position indicating the disk diameter of the disk recording medium having a maximum disk diameter or the position of the outer most periphery during the movement of the pickup. Thus, it is possible to ensure to mount the restricting pin and to stop the pickup moving to the outer periphery more than necessary without fail for preventing the damage to the pickup in advance.

Also, in the disk recording and reproducing apparatus of the present invention, the disk recording and reproducing apparatus as described above further comprises: determining means for determining the size of the loaded disk cartridge.

Therefore, since the determining means determines size of the mounted disk cartridge in addition to the operation and effect of the restricting means, it is possible to reliably determine the size of the disk cartridge.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A disk cartridge, comprising:
a first cartridge containing a first disk recording medium having a first diameter,
said first cartridge having plural holes, which have different radial positions with respect to a disk center respectively, the plural holes being indicative of a relationship between said first diameter and a predetermined diameter of a second disk recording medium contained in a second disk cartridge that is different from said first diameter of said first disk recording medium contained in said first cartridge,
wherein said holes are indicative of said disk recording medium diameters of each of said first and second disk recording mediums or an outermost operational movement of a pickup of a disk recording and reproducing apparatus for receiving said first cartridge or said second cartridge and reading data from or recording data to said first disk recording medium or said second disk recording medium, and
wherein a hole is provided in said second cartridge, and a hole in said first cartridge is provided at the same coordinate position or a same radial position as said hole in said second cartridge with respect to a disk center location in said disk recording and reproducing apparatus, regardless of the respective diameters of said first and second disk recording mediums in said first and second cartridges.

2. A disk cartridge, comprising:
a first cartridge containing a first disk recording medium having a first diameter,
said first cartridge including:
at least one hole indicative of a relationship between said first diameter and a predetermined diameter of a second disk recording medium contained in a second disk cartridge that is different from said first diameter of said first disk recording medium contained in said first cartridge,
wherein said at least one hole is provided so as to indicate the disk diameter of each disk recording medium or an outermost peripheral position during movement of a pickup, and
wherein a length of said at least one hole is indicative of
(a) a minimum disk diameter of said first disk recording medium contained in said first cartridge or
(b) said outermost operational position of said pickup.

3. A disk recording and reproducing apparatus, comprising:
a. a pickup for recording and/or reproducing information to/from a disk cartridge disposed therein,
said disk cartridge including:
a first cartridge containing a first disk recording medium having a first diameter, and a plurality of holes, which have different radial positions with respect to a disk center respectively, the plurality of holes being indicative of a relationship between said first diameter and a predetermined diameter of a second disk recording medium contained in a second disk cartridge that is different from said first diameter of said first disk recording medium contained in said first cartridge; and
b. a restricting member for restricting a movement of said pickup in an outward radial direction relative to a disk recording medium positioned in said recording and reproducing apparatus to not less than a predetermined radius,
wherein said restricting member detects said disk diameter of the disk recording medium positioned in said recording and reproducing apparatus through one of said plurality of holes and restricts radial movement of said pickup to not less than said predetermined radius.

4. The disk recording and reproducing apparatus according to claim 3, further comprising a chassis which includes said restricting member, said restricting member being made up of a plurality of restricting pins, said restricting pins being provided so as to project either toward a cartridge loaded into said disk recording and reproducing apparatus or toward a pickup housing at a position indicative of (i) a disk diameter of a disk recording medium having a maximum disk diameter or (ii) an outermost operational position of said pickup,
wherein when a second disk cartridge containing a disk recording medium having a different diameter from that of said disk recording medium contained in said first cartridge has been loaded into said recording and reproducing apparatus, at least one of said restricting pins contacts a lower surface of said loaded disk cartridge and is pushed toward said pickup housing from said chassis so as to restrict the outermost operational position of said pickup, whereas at least one of said restricting pins located radially inwardly relative to said restricting pins pushed toward said pickup housing extend into a hole in said second cartridge so as to avoid projecting toward said pickup housing from said chassis.

5. The disk recording and reproducing apparatus according to claim 4,
wherein each of said restricting pins is pushed out by an elastic material so as to tend to project toward a cartridge loaded into said chassis.

6. The disk recording and reproducing apparatus according to claim 4, wherein a restricting pin provided at a position indicating the diameter of the disk recording medium having a maximum disk diameter or the outermost operational position of said pickup, is fixed so as to project toward said pickup housing of said chassis.

7. The disk recording and reproducing apparatus according to claim 5, wherein a restricting pin provided at a position indicating the diameter of the disk recording medium having a maximum disk diameter or the outermost operational position of said pickup, is fixed so as to project toward said pickup housing of said chassis.

8. A disk recording and reproducing apparatus, comprising:
a. a pickup for recording and reproducing of a disk cartridge;
said disk cartridge having a plurality of holes, which have different radial positions with respect to a disk center respectively, the plurality of holes being indicative of a relationship between said first disk diameter of a disk recording medium contained therein or an outermost operational position of a pickup, and
b. a restricting member for restricting movement of said pickup in an outward operational direction to a distance which is not less than a predetermined radius,
wherein said restricting member detects a disk diameter through one of said plurality of holes and restricts movement of said pickup in said outward operational direction to a distance which is not less than said predetermined radius.

9. The disk recording and reproducing apparatus according to claim 8, comprising a chassis including a restricting member,
said restricting member comprising a plurality of restriction pins wherein those of said restriction pins located at a position corresponding to a hole in said loaded cartridge project toward said cartridge and those of said restriction pins located at a position indicating a maximum disk diameter of said disk recording medium or the outermost operational position of said pickup project toward a pickup housing, and wherein when a disk cartridge containing a disk recording medium having a second diameter different from said first diameter is loaded into said recording and reproducing apparatus, at least one of said restricting pins of the chassis contacts the lower surface of the loaded disk cartridge and is pushed toward the pickup housing from said chassis so as to restrict the outermost operational position of said pickup, whereas at least one other of said restricting pins located radially inwardly of said at least one restricting pin extends into a hole in said loaded cartridge containing said second diameter disk recording medium so as to avoid projecting toward said pickup housing from said chassis.

10. The disk recording and reproducing apparatus according to claim 9, wherein each of said restricting pins is pushed out by an elastic material so as to tend to project toward a cartridge loaded into said chassis.

11. The disk recording and reproducing apparatus according to claim 9, wherein a restricting pin is provided at the position which indicates the maximum disk diameter of a disk recording medium or at the outermost operational position of said pickup, and that restricting pin is fixed so as to project toward said pickup housing of said chassis.

12. The disk recording and reproducing apparatus according to claim 10, wherein a restricting pin is provided at the position which indicates the maximum disk diameter of a disk recording medium or at the outermost operational position of said pickup, and that restricting pin is fixed so as to project toward said pickup housing of said chassis.

13. A disk recording and reproducing apparatus, comprising:
a. a pickup for recording and reproducing a disk cartridge; said disk cartridge including a first cartridge containing a first disk recording medium having a first diameter, and a plurality of holes, which have different radial positions with respect to a disk center respectively, the plurality of holes being indicative of a relationship between a second disk diameter of a second disk recording medium contained in a second disk cartridge and said first disk diameter, said second disk diameter being different from said first disk diameter, and said plurality of holes being provided so as to indicate the disk diameter of said each disk recording medium or an outermost operational position of said pickup,
said plurality of holes of said each cartridge being provided at the same coordinate positions or at the same radial positions with respect to a disk center of said disk recording and reproducing apparatus, regardless of the respective diameters of said disk recording mediums, and
b. a restricting member for restricting a movement of said pickup in an outward operational direction to not less than a predetermined radius, wherein said restricting member detects a disk diameter through one of said plurality of holes and restricts said movement of said pickup in said outward operational direction to not less than said predetermined radius.

14. The disk recording and reproducing apparatus according to claim 13, further comprising a chassis which includes the restricting member,
the restricting member being made up of a plurality of radially disposed restricting pins, said restricting pins being provided so as to project either toward a cartridge loaded into said disk recording and reproducing apparatus or toward a pickup housing at a position indicative of (i) a disk diameter of a disk recording medium having a maximum disk diameter or (ii) an outermost operational position of said pickup, wherein when a second disk cartridge containing a disk recording medium having a different diameter from that of said disk recording medium contained in said first cartridge has been loaded into said recording and reproducing apparatus, at least one of said restricting pins contacts a lower surface of said loaded disk cartridge and is pushed toward said pickup housing from said chassis so as to restrict the outermost operational position of said pickup, whereas at least one of said restricting pins located radially inwardly relative to said restricting pins pushed toward said pickup housing extend into a hole in said second cartridge so as to avoid projecting toward said pickup housing from said chassis.

15. The disk recording and reproducing apparatus according to claim 14, wherein each of said restricting pins is pushed out by an elastic material so as to tend to project toward said cartridge of said chassis.

16. The disk recording and reproducing apparatus according to claim 14, wherein one of said restricting pins provided at said position indicating a maximum one of said disk diameters of said disk recording mediums or said outermost operational position of said pickup, is fixed so as to project toward said pickup housing of said chassis.

17. The disk recording and reproducing according to claim 15,
wherein the one of said restricting pins provided at said position indicating a maximum one of said disk diameters of said disk recording mediums or said outermost operational position of said pickup, is fixed so as to project toward said pickup housing of said chassis.

18. A disk recording and reproducing apparatus, comprising:
a. a pickup for recording and reproducing a disk cartridge; said disk cartridge including a first cartridge containing a first disk recording medium having a first diameter
at least one hole for recognizing a relation in size between a second diameter of a second disk recording medium contained in a second disk cartridge, said second disk diameter being different from said first disk diameter,
said hole being provided so as to indicate said disk diameters of each of said disk recording mediums or an outermost operational position of said pickup, a length of said hole being indicative of a difference in disk diameter between a minimum diameter disk recording medium and (a) said first diameter of said first disk recording medium or (b) the outermost operational position of said pickup, and
b. a restricting member for restricting a movement of said pickup in an outward radial direction to not less than a predetermined radius, wherein said restricting member detects said minimum disk diameter through said hole and restricts the movement of said pickup in said outward radial direction to not less than said predetermined of radius.

19. The disk recording and reproducing apparatus according to claim 18, further comprising a chassis which includes the restricting member, the restricting member being made up of a plurality of radially disposed restricting pins, said restricting pins being provided so as to project either toward a cartridge loaded into said disk recording and reproducing apparatus or toward a pickup housing at a position indicative of (i) a disk diameter of a disk recording medium having a maximum disk diameter or (ii) an outermost operational position of said pickup, wherein when a second disk cartridge containing a disk recording medium having a different diameter from that of said disk recording medium contained in said first cartridge has been loaded into said disk recording and reproducing apparatus, at least one of said restricting pins contacts a lower surface of said second loaded disk cartridge and is pushed toward said pickup housing from said chassis so as to restrict the outermost operational position of the pickup, whereas at least one of said restricting pins located radially inwardly relative to said restricting pins pushed toward said pickup housing extend into a hole in said second cartridge so as to avoid projecting toward said pickup housing from said chassis.

20. The disk recording and reproducing apparatus according to claim 19, wherein each of said restricting pins is pushed out by an elastic material so as to tend to project toward said cartridge in said chassis.

21. The disk recording and reproducing apparatus according to claim 19, wherein the one of said restricting pins provided at said position indicative of said maximum diameter of said disk recording mediums or said outermost operational position of said pickup, is fixed so as to project toward said pickup housing of said chassis.

22. The disk recording and reproducing apparatus according to claim 20, wherein the one of said restricting pins provided at said position indicative of said maximum diameter of said disk recording mediums or said outermost operational position of said pickup, is fixed so as to project toward said pickup housing of said chassis.

23. A disk recording and reproducing apparatus, comprising:
   (a) a pickup for recording and reproducing a disk cartridge;
       said disk cartridge including a first cartridge containing a first disk recording medium having a first diameter,
       at least one hole for recognizing a relation in size between a second disk recording medium having a second diameter contained in a second disk recording medium and said first diameter, said second diameter being different from said first diameter, said hole being indicative of said disk diameters of said disk recording mediums or an outermost operational position of a pickup, a length of said hole being indicative of (a) a difference in disk diameter between a disk recording medium having a minimum disk diameter and said first diameter of said first disk recording medium or (b) the outermost operational position of said pickup,
   said apparatus having a structure in which a length of said hole is detected so as to mechanically define a movable outer operational position of said pickup.

24. A disk recording and reproducing apparatus, comprising:
   a. a pickup for recording and reproducing of a disk cartridge;
       said disk cartridge including a first cartridge containing a first disk recording medium having a first diameter, and at least one hole for recognizing a relation in size between a disk diameter of a second disk recording medium contained in a second cartridge different from said first disk diameter, said hole being indicative of said disk diameters of said disk recording mediums or an outermost operational position of a pickup, a length of said hole being indicative of (a) a difference between a disk diameter of a minimum disk recording medium diameter and said first diameter of said first disk recording medium or (b) the outermost operational position of said pickup, and
   b. a chassis,
       said chassis including a single restriction pin provided so as to be movable radially and to contact said pickup, said restriction pin being inserted into said hole of each of said cartridges during its loading into said apparatus.

25. A disk recording and reproducing apparatus, comprising:
   a. a pickup for recording data to and/or reproducing data from disk cartridges, wherein each said disk cartridge contains a disk recording medium and different disk cartridges contain disk recording media having different diameters relative to each other, said disk cartridges each having a plurality of holes therein which have different radial positions with respect to a disk center respectively, the plurality of holes being indicative of a relationship between a disk recording medium diameter of one cartridge and a predetermined disk recording medium diameter of another cartridge that is different from the diameter of the disk recording medium contained in the one cartridge, and
   b. a chassis, including:
       a restricting member which engages and exerts pressure against a cartridge loaded into said disk recording and reproducing apparatus and is disposed in contact with said pickup when a disk cartridge is loaded into said disk recording and reproducing apparatus so as to restrict movement of said pickup in an outward radial direction to a distance not less than a predetermined radius.

26. A disk recording and reproducing apparatus, comprising:
   (a) a pickup for recording data to and/or reproducing data from disk cartridges, wherein each said disk cartridge contains a disk recording medium and different disk cartridges respectively each contain disk recording media having different disk diameters relative to each other, and
   (b) restricting means for restricting movement of said pickup in accordance with maximum pickup movement indicia provided by a disk cartridge loaded into said disk recording and reproducing apparatus, the loaded disk cartridge having plural holes, which have different radial positions with respect to a disk center respectively, said plural holes being indicative of (i) a relationship between a first diameter of a first disk recording medium contained in said loaded disk cartridge and a predetermined diameter of a second disk recording medium contained in a another disk cartridge that is different from said first diameter of said first disk recording medium contained in said loaded disk cartridge, or (ii) an outermost operational movement of said pickup of said disk recording and reproducing apparatus,
   wherein a hole is provided in said another cartridge, and a hole in said loaded cartridge is provided at the same coordinate position or a same radial position as said hole in said another cartridge with respect to a disk center location in said disk recording and reproducing apparatus, regardless of the respective diameters of said first and second disk recording mediums.

27. The disk recording and reproducing apparatus according to claim 26, further comprising:
   determining means for determining said maximum pickup movement indicia of said loaded cartridge.

* * * * *